US012053052B2

(12) United States Patent
Antonelli et al.

(10) Patent No.: US 12,053,052 B2
(45) Date of Patent: Aug. 6, 2024

(54) FUNCTION SCREEN PRINTING ON UPPER

(71) Applicant: adidas AG, Herzogenaurach (DE)

(72) Inventors: Bruno Jean Antonelli, Herzogenaurach (DE); Nina Ludwig, Herzogenaurach (DE); Timothy Kelvin Robinson, Herzogenaurach (DE); Daniel Stephen Price, Herzogenaurach (DE); Jan Hill, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/101,210

(22) Filed: Jan. 25, 2023

(65) Prior Publication Data

US 2023/0157413 A1 May 25, 2023

Related U.S. Application Data

(60) Continuation of application No. 16/169,502, filed on Oct. 24, 2018, now Pat. No. 11,589,652, which is a division of application No. 15/223,266, filed on Jul. 29, 2016, now abandoned, which is a division of
(Continued)

(30) Foreign Application Priority Data

Nov. 21, 2011 (DE) .......................... 102011086742.2

(51) Int. Cl.
*A43B 23/02* (2006.01)
*A43B 3/00* (2022.01)
*A43B 5/00* (2022.01)
*A43B 5/02* (2006.01)
(Continued)

(52) U.S. Cl.
CPC .......... *A43B 23/026* (2013.01); *A43B 3/0084* (2013.01); *A43B 5/00* (2013.01); *A43B 5/02* (2013.01); *A43B 13/223* (2013.01); *A43B 23/0235* (2013.01); *A43B 23/0245* (2013.01); *A43B 23/027* (2013.01); *A43B 23/028* (2013.01); *A43B 23/042* (2013.01)

(58) Field of Classification Search
None
See application file for complete search history.

(56) References Cited

U.S. PATENT DOCUMENTS

| 1,803,554 A | 5/1931 | Knilans |
| 2,147,197 A | 2/1939 | Glidden |
| 2,549,985 A | 4/1951 | Normington et al. |

(Continued)

FOREIGN PATENT DOCUMENTS

| CN | 2501345 | 7/2002 |
| CN | 101224052 | 7/2008 |

(Continued)

OTHER PUBLICATIONS

U.S. Appl. No. 13/683,480, Non-Final Office Action mailed Jan. 21, 2016, 10 pages.
(Continued)

*Primary Examiner* — Michael P. Rodriguez
(74) *Attorney, Agent, or Firm* — Kilpatrick Townsend & Stockton LLP

(57) ABSTRACT

Described are shoes, in particular a sports shoe, wherein at least a portion of an upper of the shoe includes a first layer and a functional second layer, wherein the functional second layer is directly printed onto the first layer.

27 Claims, 15 Drawing Sheets

Related U.S. Application Data application No. 13/683,480, filed on Nov. 21, 2012, now Pat. No. 9,491,987.

(51) Int. Cl.
   *A43B 13/22* (2006.01)
   *A43B 23/04* (2006.01)

(56) References Cited

U.S. PATENT DOCUMENTS

| | | | |
|---|---|---|---|
| 4,447,967 | A | 5/1984 | Zaino |
| 5,339,545 | A | 8/1994 | Paris |
| 5,345,638 | A | 9/1994 | Nishida |
| 5,896,683 | A | 4/1999 | Foxen et al. |
| 6,029,376 | A | 2/2000 | Cass |
| 6,931,762 | B1 | 8/2005 | Dua |
| 6,990,755 | B2 | 1/2006 | Hatfield et al. |
| 7,047,668 | B2 | 5/2006 | Burris et al. |
| 7,155,846 | B2 | 1/2007 | Alfaro et al. |
| 7,636,974 | B2 | 12/2009 | Meschter et al. |
| 8,209,883 | B2 | 7/2012 | Lyden |
| 8,266,749 | B2 | 9/2012 | Dua et al. |
| 8,993,061 | B2 | 3/2015 | Jones et al. |
| 9,491,987 | B2 | 11/2016 | Antonelli et al. |
| 2004/0049942 | A1 | 3/2004 | Chen |
| 2005/0160622 | A1 | 7/2005 | Chen |
| 2005/0166427 | A1 | 8/2005 | Greene et al. |
| 2006/0143951 | A1 | 7/2006 | Yang et al. |
| 2007/0022627 | A1 | 2/2007 | Sokolowski et al. |
| 2007/0137066 | A1 | 6/2007 | Chen |
| 2007/0245595 | A1 | 10/2007 | Chen et al. |
| 2008/0127519 | A1 | 6/2008 | Byrne et al. |
| 2008/0147219 | A1 | 6/2008 | Jones |
| 2008/0250668 | A1 | 10/2008 | Marvin et al. |
| 2009/0110919 | A1 | 4/2009 | Panse |
| 2009/0113766 | A1 | 5/2009 | Hooper |
| 2009/0163099 | A1 | 6/2009 | Ackroyd et al. |
| 2011/0061149 | A1 | 3/2011 | Polacco et al. |
| 2011/0192059 | A1 | 8/2011 | Spanks et al. |
| 2011/0247240 | A1 | 10/2011 | Eder et al. |
| 2011/0258874 | A1 | 10/2011 | Riddleberger |
| 2011/0258883 | A1 | 10/2011 | Eder et al. |
| 2012/0055044 | A1* | 3/2012 | Dojan ............ A43B 23/0245 36/83 |

FOREIGN PATENT DOCUMENTS

| | | | |
|---|---|---|---|
| DE | 3347237 | | 7/1984 |
| DE | 3539573 | | 2/1988 |
| DE | 4103389 | | 8/1992 |
| DE | 60106757 | | 12/2005 |
| GB | 1445781 | | 8/1976 |
| GB | 1445781 | A * | 8/1976 ........... A43B 23/086 |
| JP | 1181151 | | 7/1999 |
| WO | 2010/055276 | A1 | 5/2010 |
| WO | 2010142393 | | 12/2010 |
| WO | WO-2010142393 | A1 * | 12/2010 ......... C08G 18/0828 |
| WO | 2014015037 | | 1/2014 |

OTHER PUBLICATIONS

U.S. Appl. No. 13/683,480, Notice of Allowance mailed May 6, 2016, 7 pages.
U.S. Appl. No. 15/223,266, Final Office Action mailed Aug. 28, 2018, 16 pages.
U.S. Appl. No. 15/223,266, Non-Final Office Action mailed Apr. 10, 2018, 16 pages.
U.S. Appl. No. 15/223,266 , Non-Final Office Action, Dec. 4, 2018, 21 pages.
U.S. Appl. No. 15/223,266, "Final Office Action", Mar. 21, 2019, 18 pages.
U.S. Appl. No. 15/223,266, "Notice of Allowance", Jun. 5, 2019, 9 pages.
Chinese Patent Application No. 201210477370.5, Office Action mailed Oct. 10, 2014, 9 pages (No English translation available. A summary of the Office Action was provided in the Transmittal Letter submitted with the IDS filed in U.S. Appl. No. 13/683,480 on Dec. 2, 2014).
German Patent Application No. 102011086742.2, Office Action mailed May 4, 2017, 7 pages (No. English translation available. A summary of the Office Action was provided in the Transmittal Letter submitted with the IDS filed in U.S. Appl. No. 15/223,266 on Jan. 23, 2018).
European Patent Application No. 12193599.3, Extended European Search Report mailed Mar. 31, 2013, 5 pages.
European Patent Application No. 12193599.3, Office Action mailed Jan. 22, 2018, 6 pages.
German Patent Application No. 102011086742.2, Office Action mailed Oct. 15, 2012, 8 pages (English machine translation submitted).
German Patent Application No. 102011086742.2, Office Action mailed Jun. 19, 2019, 8 pages (English machine translation submitted).
Chinese Patent Application No. 201210477370.5, Office Action mailed May 11, 2015, 17 pages (English machine translation submitted).
Chinese Patent Application No. 201210477370.5, Office Action mailed Sep. 17, 2015, 7 pages (English machine translation submitted).
U.S. Appl. No. 15/223,266, Non-Final Office Action mailed Dec. 2, 2019, 13 pages.
European Application No. 19196977.3, Extended Search Report Mailed Dec. 5, 2019, 6 pages.
U.S. Appl. No. 15/223,266, Final Office Action mailed Mar. 23, 2020, 17 pages.
European Patent Application No. 19196977.3, European Search Report mailed Dec. 5, 2019, 6 pages.
European Application No. 19196977.3, Office Action mailed Jun. 10, 2021, 4 pages.
European Application No. 19196995.5, Office Action mailed Jun. 10, 2021, 5 pages.
Office Action, European Patent Application No. 19196995.5, Oct. 18, 2022, 4 pages.
Office Action, European Patent Application No. 19196977.3, Oct. 12, 2022, 5 pages.
*U.S. Appl. No. 16/169,502, Non-Final Office Action, May 27, 2021, 9 pages.
*U.S. Appl. No. 16/169,502, Final Office Action, Oct. 6, 2021, 8 pages.
*U.S. Appl. No. 16/169,502, Non-Final Office Action, Mar. 31, 2022, 8 pages.
*U.S. Appl. No. 16/169,502, Notice of Allowance, Oct. 24, 2022, 8 pages.
Office Action, European Patent Application No. 19196977.3, Jul. 6, 2023, 4 pages.
Office Action, European Patent Application No. 19196977.3, Apr. 8, 2024, 8 pages.

* cited by examiner

High strain            Low strain

BLACK A0QM

"MIRROR EFFECT"
SHINY BLACK

ENERGY S06
BLACK
GRADING SPRAY

"MATE EFFECT"
APOLLO F07 A1GQ

MATE SILVER
A0TR

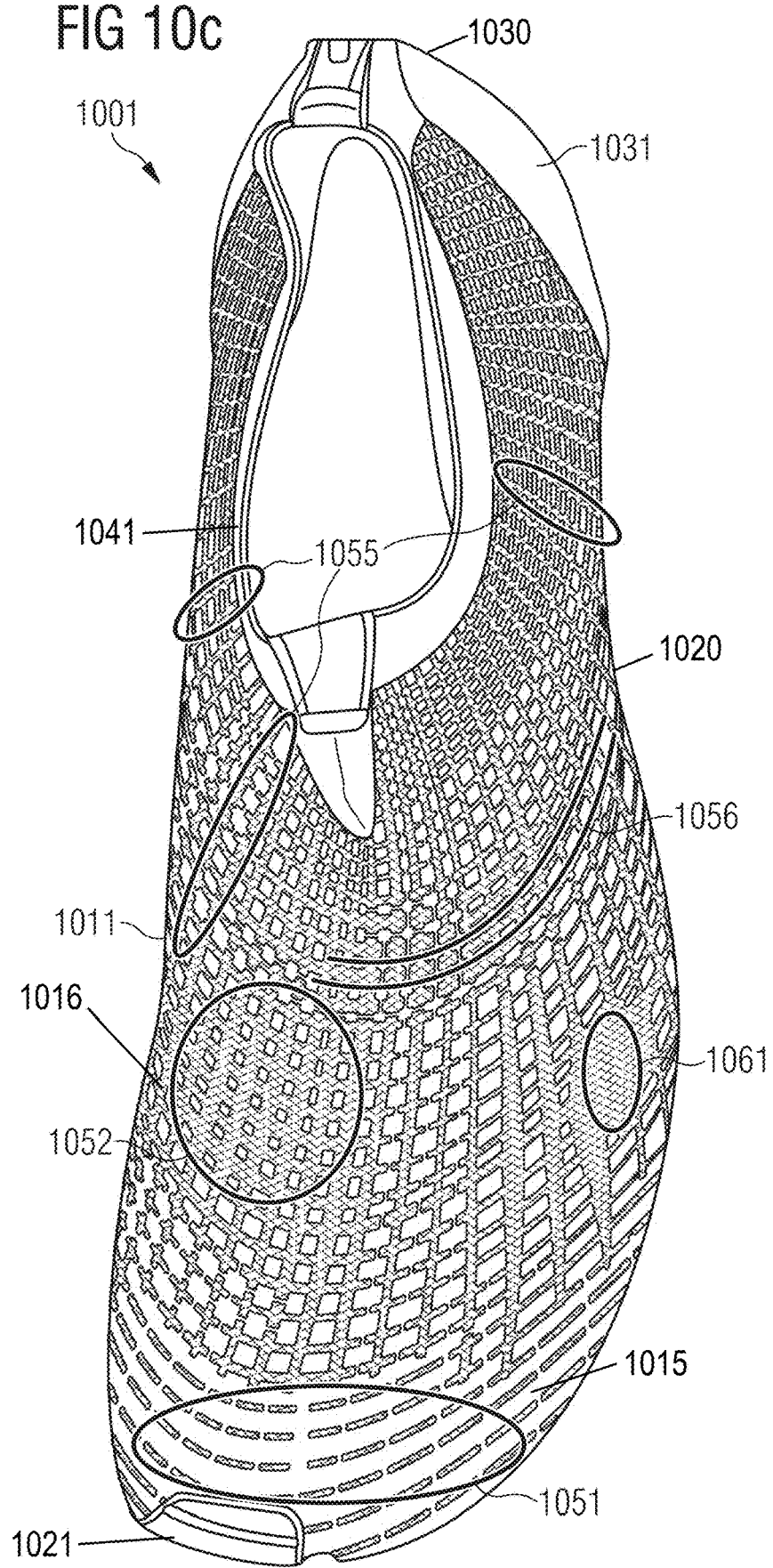

FUNCTION SCREEN PRINTING ON UPPER

CROSS REFERENCE TO RELATED APPLICATION

This application is a continuation of U.S. patent application Ser. No. 16/169,502, filed Oct. 24, 2018, and entitled FUNCTION SCREEN PRINTING ON UPPER, (allowed), (the '502 application), which is a divisional of U.S. patent application Ser. No. 15/223,266, filed on Jul. 29, 2016, and entitled FUNCTION SCREEN PRINTING ON UPPER, (abandoned) (the '266 application), which is a divisional of U.S. patent application Ser. No. 13/683,480, filed on Nov. 21, 2012, and entitled FUNCTION SCREEN PRINTING ON UPPER, (issued), (the '480 application), which is related to and claims priority benefits from German Patent Application No. DE 10 2011 086742.2, filed on Nov. 21, 2011, and entitled FUNCTION SCREEN PRINTING ON UPPER (the '742 application). The '502, '266, '480, and '742 applications are hereby incorporated in their entireties by this reference.

FIELD OF THE INVENTION

The present invention relates to shoes, and in particular to sports shoes.

BACKGROUND

Usually, shoes provide a variety of different functionalities. These functionalities may be distinguished between functionalities of the sole, such as slip resistance, compression strength or cushioning of impacts, on the one hand, and functionalities of the upper on the other hand. For instance, the upper may provide stabilization of the foot, cushioning of movements of the foot, protection from moisture or wind, abrasion protection and/or good breathability. The respective functionalities, therein, often pose different requirements at different zones of the upper. In order to meet these requirements, various approaches are known in the prior art.

Commonly, for zones of an upper, which are supposed to provide different functionalities, individual parts may be formed of different materials, wherein the individual parts are then assembled to form an upper and, ultimately, a shoe. For example, the zones that are supposed to provide an increased stabilization of the foot may be manufactured from stronger material. Typically, the various parts are assembled by sewing, although US 2008/0250668 A1 describes a shoe whose parts are assembled by a gluing method, and US 2007/0022627 A1 discloses stability ribs that are attached to the outer parts of a shoe at desired positions.

However, these approaches known from the prior art require complex manufacturing processes because several parts have to be assembled to form an upper in a quite labor-intensive manner. The efforts required to assemble the parts may lead to the use of fewer parts having relatively larger areas. Thus, the functionality provided by a particular part may only be adjusted on a larger scale and, hence, only in a relatively coarse manner.

U.S. Pat. No. 7,047,668 B2 discloses a further approach, and in particular, a shoe, wherein the upper includes a substrate layer and a polymer layer. The substrate layer may, for example, be formed of textiles in the form of a mesh material. The polymer layer may have the general configuration of a web, and its thickness may relate to the relative degrees of wear within the shoe. The polymer layer is deposited on the substrate layer using a casting process. This casting process, however, is energy-intensive, time consuming, and complex.

DE 33 47 237 A1 discloses a method for manufacturing reinforcing elements using a meltable plastic powder. The plastic powder is applied to a supporting element in the shape of the desired reinforcing element via a screen printing method. The plastic powder is then melted in a heating station. The plastic powder is finally glued onto the upper of the shoe and cooled down under application of pressure. This method is also energy-intensive and involves a complex melting process. Due to the granularity of the powder, the melting process may cause shrinking. Also, because the reinforcing element is transferred from the supporting element onto the upper, the precision and applicability of this method is limited.

DE 35 39 573 C2 further discloses a method for producing a three-dimensional reinforcing element. Meltable plastic powder is applied onto a supporting element via a stencil printing method. The plastic powder is then pre-heated until the surface of the plastic sinters. The plastic powder is then transferred to a pressure element, where the plastic powder is compressed using the pressure element and melted onto the pressure element. In a further step, the reinforcing element is transferred from the pressure element and applied to the upper of the shoe which is to be reinforced. In addition to the disadvantages of melting and transfer methods discussed above, additional imprecisions arise due to the double transfer of the element from the supporting element to the pressure element and then to the upper of the shoe. Moreover, this method requires a complex pressure element, which increases the cost of the method.

GB 1 445 781 A relates to an improvement in the manufacture of footwear which incorporates fabric uppers.

US 2011/0258883 A1 relates to a ball control portion which extends from one side to an underside of an article of footwear. The ball control portion includes a lattice with a plurality of protrusions arranged in a grid. The plurality of protrusions includes multiple groups of protrusions arranged with one or more of different orientations, types, and heights.

US 2011/0061149 A1 relates to a fitness sock suitable for being worn in the performance of gymnastic activities. The sock comprises anti-slipping means positioned on a plantar surface of the sock.

DE 601 06 757 T2 relates to an improved structure of ski boots comprising a heating insert for thermoforming and/or heating and drying of the inner part of the boot.

It is therefore desirable to develop a process to overcome at least parts of the specified disadvantages of the prior art and thus to provide a shoe with adjusted functionalities in different zones that may be easily manufactured.

SUMMARY

Embodiments of the present invention include a shoe, in particular a sports shoe, wherein at least a portion of an upper of the shoe comprises a first layer and a functional second layer, wherein the functional second layer is directly printed onto the first layer.

Certain embodiments enable manufacturing shoes in a novel manner by means of a directly and functionally printed portion. Use of a directly and functionally printed portion may allow shoes to be manufactured with functional zones, wherein the labor-intensive assembly of different materials is avoided. In addition, an elaborate casting process may not be necessary. Moreover, no transfer is needed.

Instead, a functional second layer may be simply printed directly onto the first layer. Direct printing of functional layers enables a production process that is significantly less labor-intensive, faster, and more cost-effective.

In addition, direct printing of a functional second layer allows precisely adjusted functionalities. The precision of direct printing methods allow for the creation of very fine structures with small thicknesses. As a result, it is possible to adapt the functionality of the respective portions in the different zones precisely to the particular requirements within each zone.

Moreover, direct printing enables a large degree of flexibility in the manufacturing process since practically any conceivable form or structure may be printed. In addition, by means of simple direct printing, various functional second layers may be produced without changing manufacturing steps and without having to adjust manufacturing steps relative to each other. One reason for the flexibility is that printers can easily be programmed. Another reason is that stencils (e.g., for screen printing, rotary printing, and so on) may easily be changed and may be inexpensively produced.

In some embodiments, the portion comprises substantially the entire upper of the shoe. This design allows for quick and inexpensive production of the upper with locally adapted functionality because none, or only a few elements, have to be assembled. Furthermore, wearing comfort may be particularly good because the shoe includes only a few transition areas or joints that may cause discomfort to the wearer.

In certain embodiments, the functional second layer may be directly printed onto the first layer via a screen printing process. This design allows for particularly fast and inexpensive printing. Moreover, screen printing is a very precise technique.

In additional embodiments, the functional second layer may be printed onto the first layer via an ink-jet printing process. Ink-jet printing is also very precise. Furthermore, with ink-jet printing, printers may be easily programmed to change the second layer. As a result, by using several ink cartridges, different colors may be incorporated into the second layer.

In other embodiments, the functional second layer may be adapted to modify at least one mechanical property of the portion. The properties of the first layer, e.g., the material used, its elastic stretchability, its thickness etc., together with the properties of the second layer, define the properties of the portion. As a result, the shoe may be locally adjusted to the various requirements of the user.

In certain embodiments, the functional second layer may alter the elasticity of the portion. For instance, the portion may be provided with increased stability, i.e. increased stiffness. By improving the fixation of the foot, for example, the wearing comfort may be improved. In addition, greater flexibility may provide a particularly soft cushioning of the foot movement in the portion.

In some embodiments, the functional second layer may alter the cushioning of the portion. For instance, increased cushioning in a football shoe may absorb shocks to the foot resulting from hard kicks.

In other embodiments, the functional second layer may alter the stiction of the portion. This feature may be advantageous for football shoes, wherein a portion with increased stiction may support ball control.

Moreover, the functional second layer may alter the abrasion resistance of the portion. Thus, the longevity of the shoe may be increased. For instance, improved abrasion resistance may be advantageous for skateboard shoes, or similar shoes, which are exposed to an increased friction between the shoe and the skateboard.

In addition to the already mentioned aspects, the functional second layer may be formed so that it provides the portion with particular protective functions. As an example, the functional second layer may increase the cut resistance of the portion, thus providing a particularly safe shoe.

Moreover, the functional second layer may provide for a particularly windproof portion. Thereby, the outdoor suitability of the shoe may be increased.

Moreover, the functional second layer may provide for a waterproof portion. This feature may be advantageous for outdoor shoes where the shoe protects the foot from rain or splash water.

In addition to the above-mentioned functionalities, the functional second layer may change the mechanic properties of the portion in many other ways.

In some embodiments, the portion may be elastically deformed by at least 30% in at least one direction, and may be further elastically deformed by at least 50% in at least one direction. Thereby, the shoe may be elastically flexible or elastically compressible. Due to this elasticity, the portion may, for example, flexibly adjust to the exact size and shape of a foot. Moreover, the wearing comfort may thus be improved since the portion feels particularly soft.

In certain embodiments, the functional second layer comprises polyurethane. Polyurethane may allow for functional second layers with suitable mechanical properties.

In certain embodiments, the functional second layer comprises a poly(tetrahydrofurane)-based polyurethane dispersion (tetrahydrofurane: THF). Using the poly-THF-based polyurethane dispersion allows for precise direct printing and enables portions with excellent elasticity properties, even if the printed second layers are thin. These second layers may be characterized by large tensile strength, low hysteresis, and longevity.

In some embodiments, the functional second layer modifies the elasticity of the portion in an anisotropic manner, wherein the elasticity of the portion is in general determined by the combination of the properties of the first and second layers. Thus, the elasticity may be adapted so that deforming the portion in different directions requires different forces. For example, the forces required to elastically deform the portion along the longitudinal and lateral directions of the shoe, respectively, may be controlled independently from each other. The portion may be characterized, for example, by a lower elastic restoring force along the longitudinal direction of the shoe. Thus, the portion is more stretchable in this direction and thus better adjusts to the shape of the foot. At the same time, an increased elastic restoring force along the lateral direction of the shoe provides improved stabilization of the foot within the shoe. Thus, the adjustment of the shoe and the stability provided by the shoe may be designed in a desirable manner. For example, a precise adaptation to specific types of sports/motion sequences may thus be achieved, e.g., to lateral types of sports, such as football, basketball, or tennis, as opposed to linear types of sports, such as running.

In other embodiments, the functional second layer comprises a plurality of isolated layer areas. These isolated layer areas may be directly printed in a single printing step. The functional second layer does not have to be deposited substantially area-wide. Rather, by means of direct printing, the functional second layer may be specifically deposited locally, in the locations where it is actually required. Thus, the area of the functional second layer may be reduced to the amount actually required, leading to a lighter and more breathable shoe. In addition, the material costs of the shoe may be reduced.

According to certain embodiments, at least one isolated layer area of the second layer comprises dimensions that are smaller than 2 mm in at least one direction. Through use of such small areas, the functionality of the portion may be controlled with high local resolution.

In some embodiments, the functional second layer is only arranged on selected zones of the first layer. Since the functional second layer is only required in certain zones, it is accordingly also only arranged in the zones where it is actually needed, for example to modify at least one mechanical property of the portion. The remaining zones are free of the second layer so that an increased breathability of the portion may be achieved. Moreover, the weight of the portion may thus be minimized.

In certain embodiments, the selected zones are arranged along at least one of a collar, a transition area between a sole and the upper, a toe area, a heel area, and an area of lateral and/or medial midfoot joints. As a result, these zones may have an increased strength.

Arranging the zones along the collar of the shoe may improve the hold of the foot in the upper and may prevent the foot from slipping out of the shoe or even losing the shoe.

Arranging the zones in a transition area between the upper and the sole may improve the stability provided to the foot by the upper, and may particularly prevent sliding of the foot within the shoe. This feature may be particularly important for lateral movements.

Arranging the zones in the toe area may provide additional stabilization of the foot. This feature may be particularly advantageous for running, wherein the first ground contact often occurs in the toe area, but also for stopping/decelerating. Moreover, the particularly tight contact of foot and toes may create the feeling of a particularly sensitive shoe.

Arranging the zone in the heel area may provide stabilization of the heel in the shoe and may prevent the heel from sliding out of the shoe, as well as unpleasant rubbing of the heel on the shoe.

Arranging the zones in the area of the lateral and/or medial midfoot joints may provide additional stabilization of the foot. Due to the rather small dimension of the foot in this area, stabilization of the foot in this area may be perceived as less irritating than stabilization features in other areas.

In addition to the above mentioned arrangements of the zones, other embodiments may comprise other or differently arranged zones.

In certain embodiments, the zones are selected according to the mechanical loading that occurs when using the shoe. Thus, for example, in zones in which large tensile strain may occur during use, the functional second layer may provide an increased elastic restoring force and, thus, increased stiffness.

According to some embodiments, the functional second layer may not be arranged in an instep area. In certain embodiments, elimination of the functional second layer from the instep area may improve the ease of putting on the shoe, as well as the ability of the portion to accommodate different instep heights. In other embodiments, the number and/or the dimensions of the zones in which the functional second layer is arranged may be reduced in the instep area.

Moreover, in certain embodiments, the second layer may not be arranged in an area between the toe joints and the midfoot joints. As a result, it is possible, for example, to improve rolling off the foot due to increased elasticity. In other embodiments, the number and/or the dimensions of the zones in which the functional second layer is arranged may be reduced in the area between the toe joints and the midfoot joints.

In other embodiments, further or different areas of the upper are free of the second layer.

In some embodiments, the first layer may be elastic. Thus, a particularly good adjustment of the portion to the shape of the user's foot may be achieved. Moreover, a better adaptation to the respective forces when wearing the shoe may be achieved. If the first layer is embodied as a mesh, elasticity may be provided in both the warp and weft directions. However, embodiments with a mesh that is elastic in the warp direction only, in the weft direction only, or some combination thereof may be achieved.

In certain embodiments, the first layer may be breathable. Thus, an increased breathability of the portion may be achieved, i.e., the exchange of temperature and humidity between the sectors separated by the first layer within and outside of the shoe, respectively, is improved.

In some embodiments, the first layer may be anisotropically elastic, e.g., wherein a mesh has a higher elasticity in the warp direction than in the weft direction or vice versa. Thus, the first layer may cause an anisotropic adjustment of the portion to the shape of the foot of the user and to the respective loading during usage. The anisotropic elasticity of the first layer may locally be further supported by the printed functional second layer or it may locally be counteracted by the latter, so that the functionality of the portion may additionally be improved.

In some embodiments, the portion may comprise a functional third layer. The possibility of printing a third and possibly further functional layers may provide a desirable combination of various functionalities. The functional layers may be printed using different materials. The functional layers may each provide various functions. In certain embodiments, the second layer may, for instance, change the elasticity of the portion and the functional third layer may change the stiction. The functionalities of the functional layers may result in a desirable total functionality appropriate for certain embodiments.

According to certain embodiments, the functional third layer may be printed directly onto the first layer. Thereby, the functional third layer may also be printed next to the functional second layer or may also be fitted into the functional second layer.

In some embodiments, the functional third layer may be printed directly onto the functional second layer. In particular, the functional third layer may cover the functional second layer completely or partially. This design may provide specific zones with several functionalities at the same time. In other embodiments, the functionality of the second layer may be increased by printing the third layer.

In other embodiments, the functional third layer may be directly printed onto the first layer and the functional second layer in an overlapping manner. This design may provide additional functionalities because the functionalities of the respective layers may be provided independently of each other.

Some embodiments comprise more than two directly printed functional layers. For example, some embodiments may comprise up to six printed layers or more. The respective functional layers may be printed next to each other or exactly fit into each other. As a result, they may be perfectly congruent or some of the layers may overlap the lower layers only partially. Moreover, the functional layers may be printed partially overlapping onto the first layer and one or more previously printed functional layers. Thereby, it is possible to print a wide variety of different functional layers made of different or the same materials. Their functionality may be combined flexibly to achieve an overall functionality of the portion which is—more or less—determined by all layers. Moreover, in this way, a wide variety of desired optical appearances may be achieved.

In certain embodiments, the first layer may be manufactured from a weft knitted or warp knitted material.

According to certain embodiments of the present invention, a method for manufacturing a portion for an upper of a shoe, particularly a sports shoe, comprises printing a functional second layer directly onto a first layer.

The printing method allows for a particularly precise, cost-effective, and flexible manufacture of an upper of a shoe having different functional zones.

In certain embodiments, one or more further functional layer(s) may be directly printed onto the functional second layer.

In some embodiments, the functional second layer may be dried prior to printing a further sub-layer. In certain cases, the drying may be given by a complete drying process or may only consist of drying the surface of the functional layer. In other embodiments, the functional second layer may be dried using a flash drying chamber. As a result of the drying, the adhesion of the layers with respect to each other may be improved and a particularly homogeneous functional second layer may be provided.

In other embodiments, the functional second layer may be cured. This step may assist in accelerating the production process. Curing may also provide precise control over the mechanical properties of the functional second layer.

In certain embodiments, the first layer may be manufactured from a weft knitted or warp knitted material.

Further embodiments of the shoe according to the invention are described in the dependent claims.

BRIEF DESCRIPTION OF THE DRAWINGS

In the following detailed description, embodiments of the invention are described referring to the following figures:

FIG. 1b is a schematic top view of a skeleton of a human foot indicating different zones that correspond to the zones of FIG. 1a.

FIG. 1c is a side view of the running shoe of FIG. 1a.

FIG. 7b is a top view of a shoe with the first layer directed printed with several functional layers of FIG. 7a.

FIG. 10b is a front view of the shoe of FIG. 10a.

FIG. 10c is a top view of a shoe according to certain embodiments of the present invention, wherein the shoe comprises a directly printed functional second layer.

DETAILED DESCRIPTION

Embodiments of the invention provide shoes with uppers, wherein at least a portion of the upper comprises a first layer and a functional second layer. While the uppers are discussed for use with sports shoes, they are by no means so limited. Rather, embodiments of the uppers may be used in any type of shoe including work shoes, leisure shoes, or other shoes, or otherwise as desired.

Before describing the embodiments in detail, first, the principle of different functional zones of a shoe is generally explained.

Figure 1A:
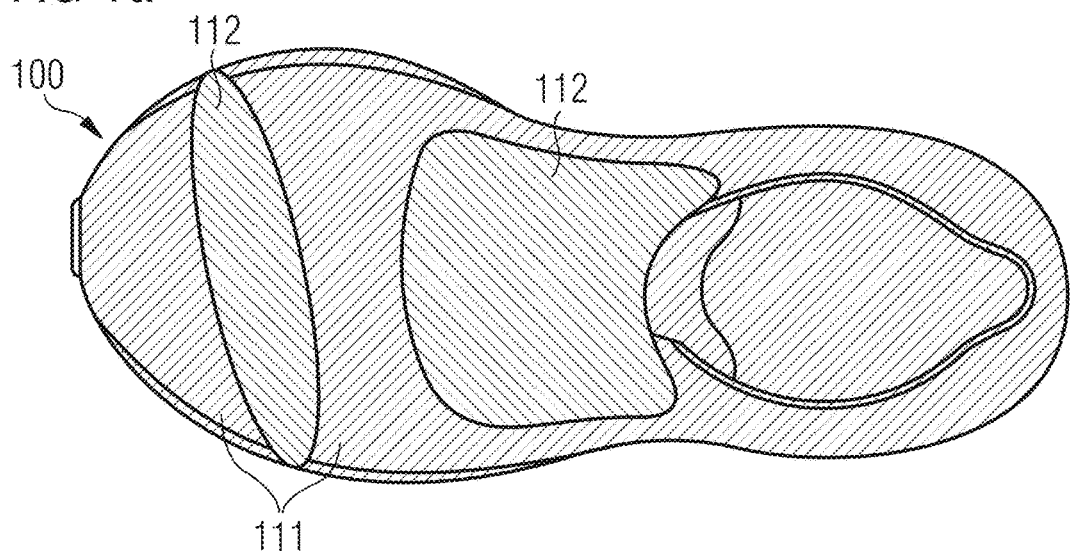
FIG. 1a is a schematic top view of a running shoe partitioned into different zones according to certain embodiments of the present invention.
Figure 1B:
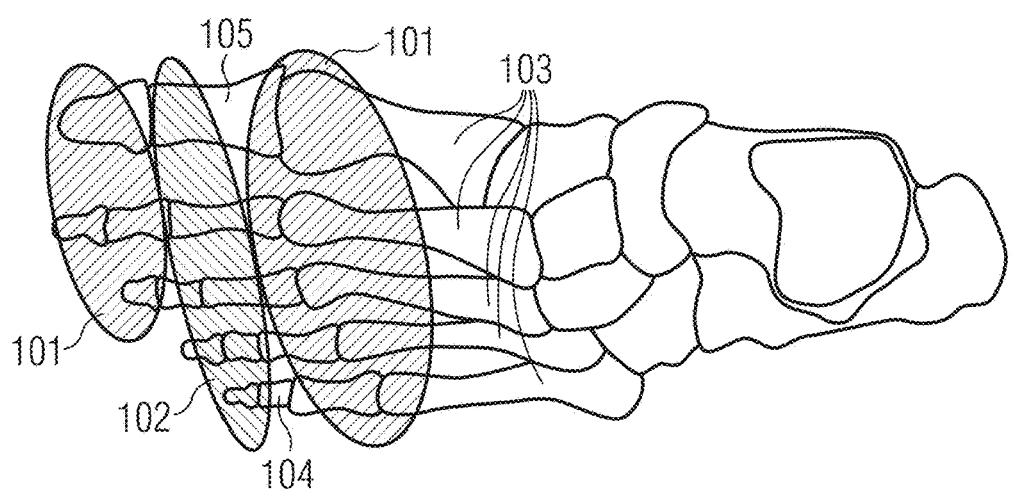
Figure 1C:
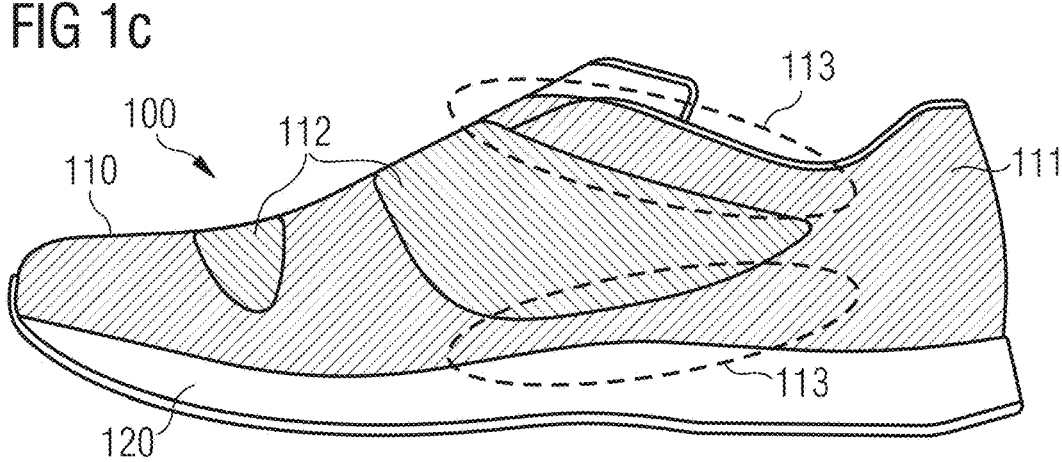

FIGS. 1a and 1c illustrate an example of a shoe 100, which is partitioned into various zones with different functional requirements. More precisely, FIGS. 1a and 1c show a top view and a side view of certain embodiments of a running shoe 100. The running shoe 100 comprises a sole 120 and an upper 110. The upper 110 comprises zones 111, in which increased stability is desired, and zones 112, in which increased flexibility is desired. The zones 111 and 112 of the shoe 100 may, for example, be adapted to the anatomy of the human foot. FIG. 1b shows corresponding zones 101 and 102 of the skeleton of the human foot, which require increased stability and flexibility, respectively. For example, in the zone 102, which is laterally positioned between phalanx proximalis of the big toe 105 and phalanx distalis of the little toe 104 and longitudinally positioned between the midfoot joints and the toe joints, as shown in FIG. 1*b*, increased flexibility of the shoe 100 is required due to the flexing action of the toes when running. However, in the zone 101, which is positioned over the toes and the metatarsals 103, as shown in FIG. 1*b*, increased stability may be desirable.

By introducing reduced strength in the zones 112, the running shoe 100 may achieve an increased wearing comfort and a reduction of possible bruises to the foot. Further, by introducing increased strength in the zones 111, for example, the lifetime of the shoe 100 may be increased. The shoe 100 may wear out or become defective, by ripping or the like, less quickly. The running shoe 100 may comprise additional zones 113, which require particularly increased stability. By means of a corresponding, specifically adapted stability, the risk of injuries, e.g. by twisting one's ankle, associated with the particular use of the shoe 100 may be minimized. Using enforcing elements only in zones 113 where these elements are actually needed also reduces the weight of the shoe 100. Thus, the load that has to be carried by the user of the shoe 100 is reduced and hence the wearing comfort of the shoe 100 is increased. Moreover, due to the reduced weight, in the case of a sports shoe, an improved performance of the user of the shoe 100 may be achieved since he may act more explosively and tire less quickly.

Depending on the specific function or usage of the shoe 100, e.g., for different types of sports, on different surfaces, for different shapes of feet or running types, further and/or other specific zones requiring stability/flexibility, such as the ones shown in FIGS. 1*a* and 1*c* may be at hand. Alternatively or in addition to dividing the shoe 100 into zones of different stability/flexibility as in the above shoe 100, shoes may also be divided into zones by means of a variety of further features. For example, zones with varying stiction of the surface, varying breathability, varying cushioning, different water and wind resistance properties, varying abrasion resistance, or varying cut resistance, etc., may be included. By correspondingly adapting the properties of the different zones to the desired properties, the functionality of the shoe 100 may be improved.

Figure 2:
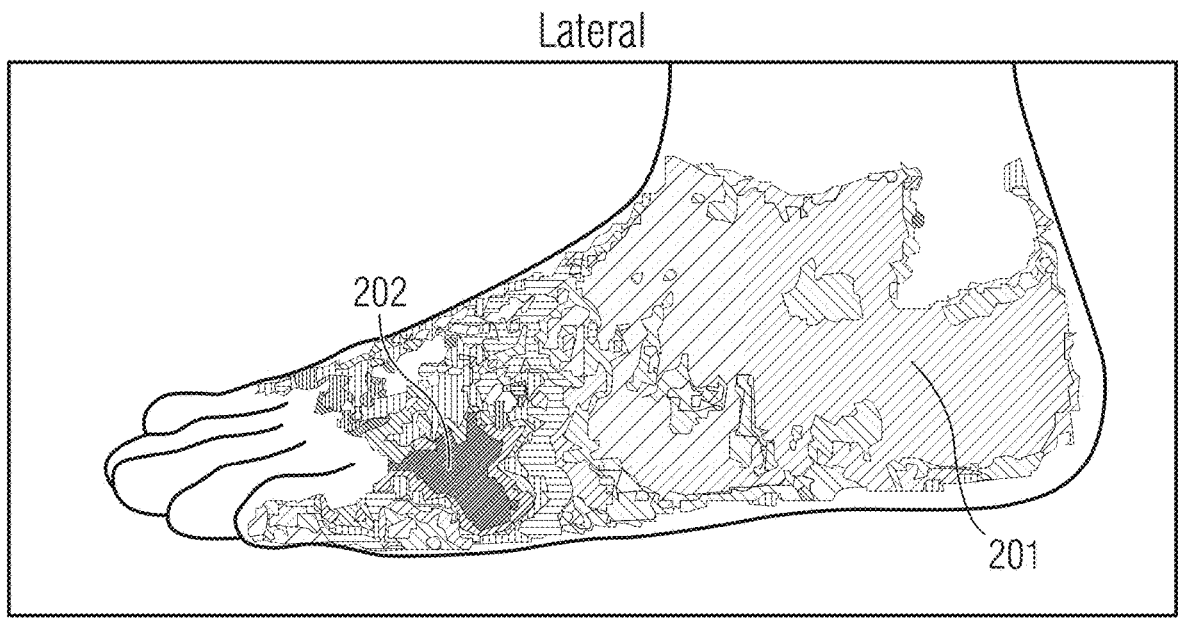
FIG. 2 are views of lateral and medial sides of a human foot indicating the location and severity of strain that occurs in the human foot during running.
Figure 2:
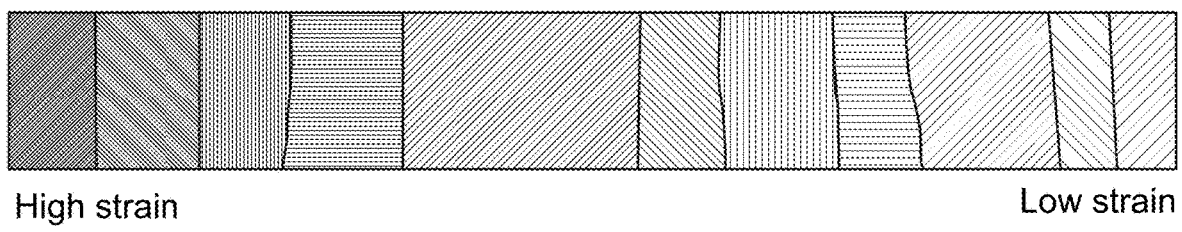
Figure 2:
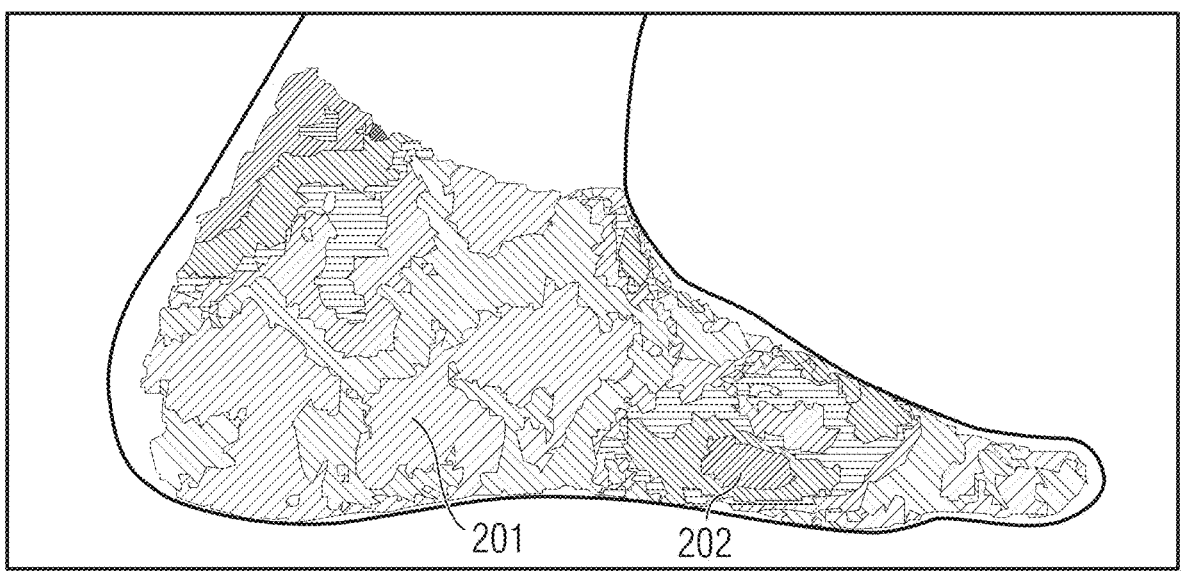

FIG. 2 illustrates a detailed analysis of different zones of a foot. In particular, the local strain of the foot at the surface of the foot, i.e. the skin, when running barefooted is illustrated graphically. It can be seen that when running barefooted, an increased strain of the foot occurs in zone 202 between the toe bones and the metatarsals, in medial as well as in lateral direction. In contrast, for example, only low strain occurs in the zone of ankle 201.

The zones of a shoe in which only low strain of the foot is to be expected may be formed with increased strength in order to stabilize the foot and thus prevent the foot from rubbing or sliding in the shoe. In the context of this application, strength or stiffness is characterized by how much a material is deformed when a specific force acts on the material. For example, the tensile strength of a first material with a length $l_1$, which extends by $\Delta_1$ when a tensile force acts upon the material along the direction of the length $l_1$, is characterized by the relative extension $\Delta l_1/l_1$. If the relative extension for an identical force is lower, the tensile strength of a material is higher. Thus, in zones of higher strength, the shoe is deformed to a lesser extent so that the foot is stabilized in that location.

However, in order to provide a comfortable feeling during running with the shoe, the zones in which a higher strain of the foot is to be expected, as shown in FIG. 2, may correspondingly be formed with higher elasticity and, in some embodiments, according to the expected degree of strain. This is, for instance, the case in zones 202. Furthermore, the area of the instep may also be formed with higher elasticity to allow for adaptation to various shapes of feet and instep heights and for ease of putting on the shoe.

Elastic material is characterized by substantially reverting to the original state after the application of a force and a corresponding deformation. Thus, the material deforms reversibly and not permanently. Therein, elastic materials may provide different restoring forces. If the elastic restoring force provided by the material is larger, the material will deform to a lesser extent when a particular external force is applied. The higher the external tensile force that is necessary to achieve various relative extensions $\Delta l_1/l_1$, the greater the tensile strength of the material. In general, an elastic material has a higher strength if it comprises larger restoring forces. This means that if the foot extends in a particular zone, the corresponding extension of the material is determined by the size of the elastic restoring forces that occur in that region. By means of reduced restoring forces, i.e. larger stretchability, the wearing comfort associated with such a zone may be increased.

Similar profiles of different functional requirements in different zones may not only be obtained for running, as shown in FIG. 2, but also for other types of sports. For example, profiles for the force transfer during cycling may be determined. In a further aspect, different zones of a football shoe that typically are used for particular actions, for example passing or dribbling, may be determined. Correspondingly, in addition to running shoes, for example also cycling shoes, basketball shoes, football shoes with special zones of specific functionalities, as well as any other types of shoes requiring special zones for particular actions may be designed.

By means of the present invention, shoes, in particular sports shoes, may be provided according to the different requirements in different zones of a shoe in a desirable manner, such as via directly printing a functional second layer on a first layer for a portion of the shoe.

Figure 3A:
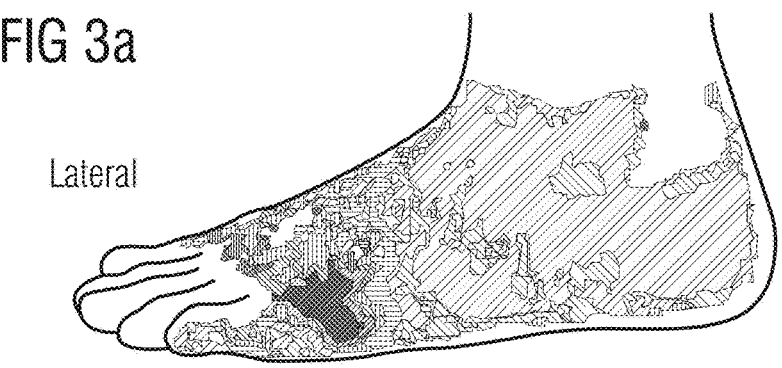
FIG. 3a is a view of the lateral side of the human foot of FIG. 2.
Figure 3B:
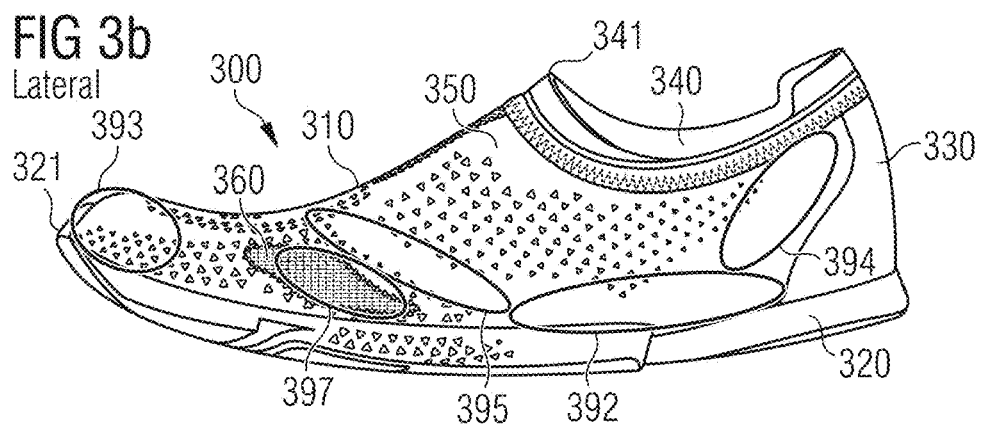
FIG. 3b is a view of a lateral side of a shoe comprising an upper with a portion having a directly printed functional second layer that locally modifies the functionality of the portion according to certain embodiments of the present invention.
Figure 3C:
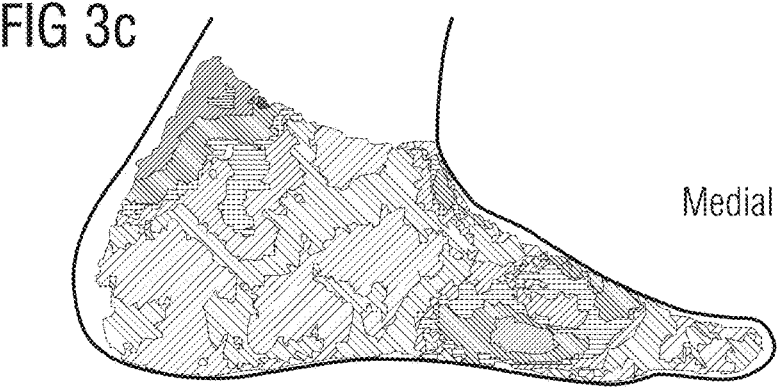
FIG. 3c is the view of the medial side of the human foot of FIG. 2.
Figure 3D:
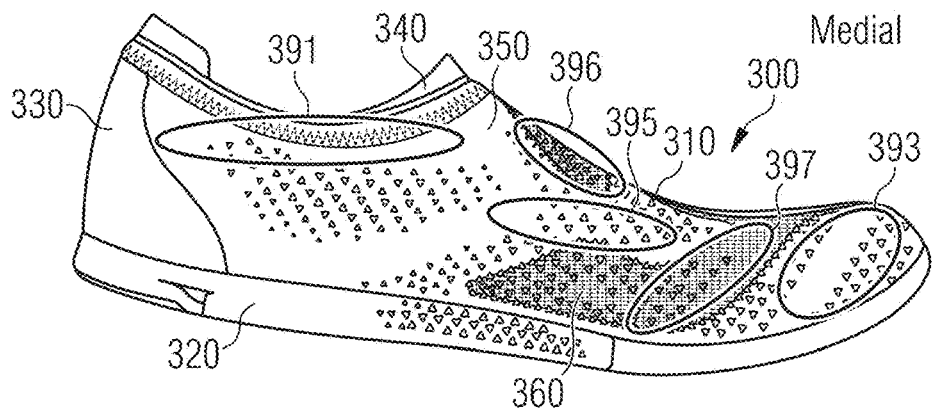
FIG. 3d is a view of a medial side of the shoe of FIG. 3b.

FIGS. 3*b* and 3*d* show certain embodiments of a shoe 300. These embodiments include a portion 310 comprising a first layer 360 and a functional second layer 350, wherein the functional second layer 350 may be printed on the first layer 360. The portion 310 may be adapted so that it meets the requirements relating to flexibility and/or stability during running according to FIGS. 3*a* and 3*c* in an optimized manner. The portion 310 comprises substantially the complete upper of shoe 300 besides the heel area 330. In other embodiments, the portion 310 may comprise a larger or smaller area of the upper. In some embodiments, the portion 310 also comprises the heel area 330. In other embodiments, the portion 310 comprises the complete upper of the shoe 300. Moreover, the shoe 300 also includes a sole 320, a heel section 330, and a collar 340.

In various embodiments, the first layer 360 may be manufactured from woven or non-woven material, e.g., weft knit or warp knit. It may comprise one or more sub-layers of material. In certain embodiments, the first layer 360 only comprises one sub-layer. According to some embodiments, the first layer 360 is elastic or breathable. In other embodiments, the first layer 360 is elastic and breathable. The first layer 360 may also be characterized by very large elastic restoring forces.

In embodiments that comprise an elastic first layer 360, the first layer 360 is adapted so that, when a force is applied parallel to the plane of the layer, the extension of the first layer 360 is independent from the direction of the force and only depends on the modulus of the force, i.e., the first layer 360 is isotropically elastic. In other embodiments with an elastic first layer 360, the aforementioned extension of the first layer 360 additionally depends on the direction of the force, i.e., the first layer 360 is anisotropically elastic.

In certain embodiments, the first layer 360 comprises a polyester woven mesh. The polyester woven mesh may be elastically stretchable and/or air-permeable. In some embodiments, the polyester woven mesh is isotropically elastic. In other embodiments, the polyester woven mesh is anisotropically elastic. For example, the extension in a first direction of the mesh, when a predetermined force is applied along the first direction of the mesh, may be larger than the extension in a second direction of the mesh when the same predetermined force is applied along the second direction of the mesh. The anisotropy may be caused by the structure of the mesh. For example, the elasticity in a warp (longitudinal direction) may be different from the elasticity in a weft (transverse direction). In certain embodiments, the elastic first layer 360 may be adapted so that it is characterized by increased stretchability in a longitudinal direction of the shoe 300, e.g. referring to FIG. 3b, from the tip of the collar 341 in the direction of the tip 321. In some embodiments, thus, a particularly good fit of the shoe 300 may be achieved.

Figure 3E:
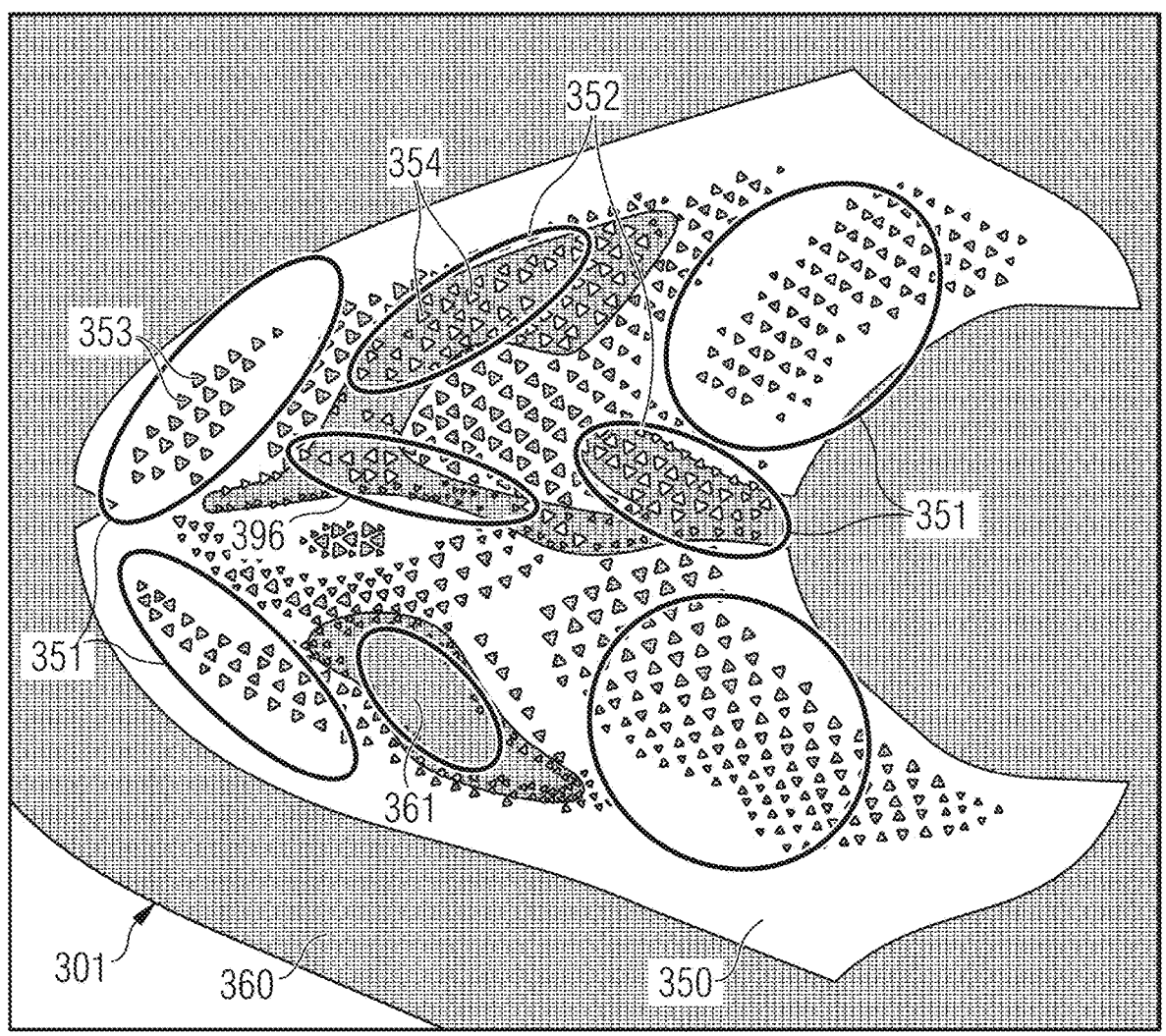
FIG. 3e is a top view of a first layer of the shoe of FIG. 3b, wherein the functional second layer is directly printed thereon.

FIG. 3e shows a work piece 301 that is manufactured by printing a functional second layer 350 on the first layer 360. A portion 310 of the shoe 300 shown in FIGS. 3b and 3d may be manufactured from the work piece 301.

In some embodiments, the second layer 350 is elastic. The second layer 350 therefore changes the elasticity of the printed portion. As an example, the second layer 350 may increase the tensile strength of the portion 310. In certain embodiments, the second layer 350 may comprise larger elastic restoring forces than the first layer 360.

The second layer 350 may be printed using a variety of printable substances that provide a functional second layer 350. In some embodiments, the printed second layer 350 may comprise rubber. In other embodiments, the printed second layer 350 may comprise silicon. In further embodiments, the printed second layer 350 may comprise polyurethane.

In certain embodiments, the second layer 350 may comprise a poly-THF-based polyurethane dispersion, which is known from WO 2010/142393 and manufactured by the company Bayer. This dispersion is well-suited for precise printing on shoes as will be described in more detail below. Moreover, the printed polyurethane layers of this type are characterized by special elastic properties, e.g., by large elastic restoring forces. Through application of thin printed layers of this material, the elastic restoring forces of different first layers may be increased so that they are suitable as a material to form an upper of a sports shoe. In embodiments in which the first layer 360 consists of polyester, the elasticity of the portion 310, at least in the printed zones, is substantially determined by the printed functional second layer 350. The elastic properties of such a portion 310 are explained in more detail below.

Figure 4A:
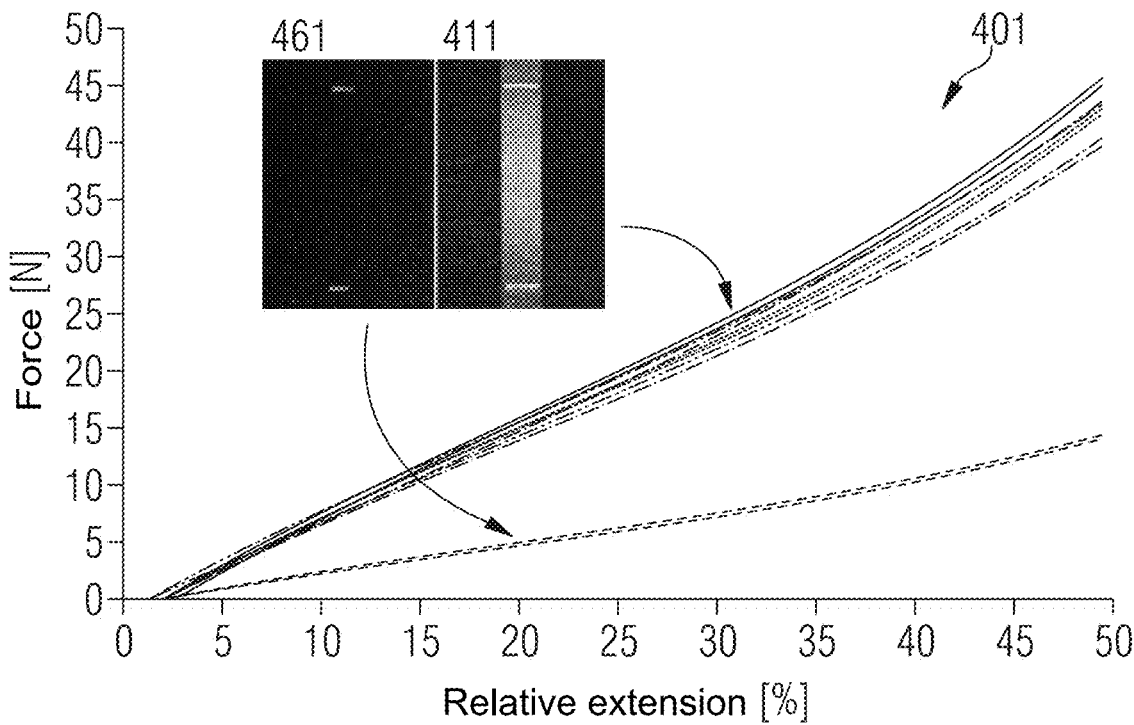
FIG. 4a is a force-strain diagram of a portion comprising a first layer made from polyester mesh and a portion comprising a first layer made from polyester combined with directly printed layers made of poly-THF-based polyurethane dispersion, wherein the strain in each portion is accomplished along the warp direction.
Figure 4B:
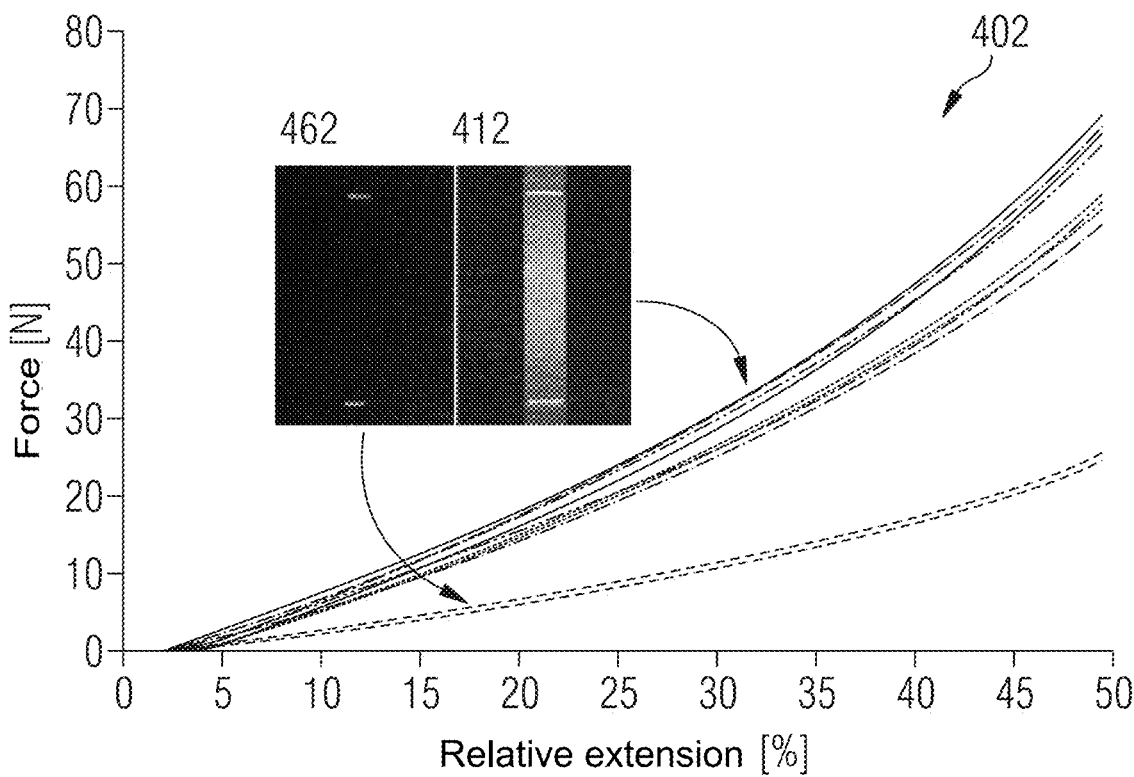
FIG. 4b is a force-strain diagram of a portion comprising a first layer made from polyester mesh and a portion comprising a first layer made from polyester combined with directly printed layers made of poly-THF-based polyurethane dispersion, wherein the strain in each portion is accomplished along the weft direction.

FIGS. 4a and 4b, respectively, show force-strain diagrams 401 and 402, respectively, for comparative samples 461 and 462, respectively, which comprise a first layer of polyester. The samples 461 and 462 each have a length of 10 cm and a width of 1 cm, wherein the portion 461 extends along the warp direction of the mesh, and the portion 462 extends along the weft direction of the mesh. The force-strain diagrams illustrate the tensile force that is required for a specific relative elongation in longitudinal direction. The comparison of FIGS. 4a and 4b shows that the samples comprise a higher tensile strength in the weft direction of the mesh of the first layer than in the warp direction. Thus, the respective sample is anisotropically elastic. As can be seen from FIGS. 4a and 4b, the samples 461 and 462 may be extensively stretched. A relative stretch of 50% is achieved for forces in the range of 20-25 N in the weft direction (see FIG. 4b) and for forces in the range of 10-15 N in the warp direction (see FIG. 4a).

Moreover, FIGS. 4a and 4b show force-strain curves for portions 411 and 412, respectively, which comprise a first layer of polyester and up to six directly printed layers made of poly-THF-based polyurethane dispersion. Therein, the dispersion is admixed with 2% methylene diphenyl diisocyanate (Desmodur®, a cross-linking agent sold by the company Bayer MaterialScience). The portions 411 and 412, similar to the samples 461 and 462, each have a length of 10 cm and a width of 1 cm. In the portions 411 and 412, the first layer is printed with six functional layers each having a width of 1 cm, wherein the layers extend centrally along the portions and are printed on top of each other. With respect to portion 411, the six functional layers are printed along the warp direction of the mesh of the first layer. With respect to portion 412, the six function layers are printed along the weft direction of the mesh of the first layer. To form portion 412, the mesh was rotated by 90° from its position when the portion 411 was formed.

As can be seen from FIGS. 4a and 4b, the portions 411 and 412 are strongly elastically tensile. They may be elastically strained up to 50% or more. In order to achieve a relative strain of 50%, a tensile force in the range of 35-50 N (warp, FIG. 4a) and of 55-70 N (weft, FIG. 4b) has to be applied, respectively. It is further possible to create an anisotropic elasticity for area-wide printed portions. A comparison with the curves of the first layers that are not printed, i.e., the samples 461 and 462, shows that the functional layer strongly increases the tensile strength. Only one sixth of the area of the portion is printed, but nevertheless the tensile strength is increased by a factor of four (FIG. 4a) and by a factor of three (FIG. 4b), respectively. Such a large tensile strength is suitable to absorb strong forces that may occur in a shoe.

Portions 411 and 412 depicted in FIGS. 4a and 4b show slightly different measured curves that relate to portions comprising functional layers having different admixtures of color pigments. In some embodiments, the poly-THF-based polyurethane dispersion is admixed with 2% of color pigments. In other embodiments, 10% of color pigments are admixed. FIGS. 4a and 4b show that admixing different fractions of color pigments has only minor impact on the tensile strength of the created functional layers. Thus, it is possible to choose the admixture of the color pigments substantially independent from the desired tensile strength. It is also possible to precisely control the tensile strength of the printed layers. This precise control is explained in more detail by the following methods (e.g., changing the geometry or the thickness of the layer).

FIGS. 4a and 4b are merely examples of some embodiments of a portion. Other embodiments may comprise higher or lower tensile strengths. As will be explained in more detail below, e.g., the thickness of one or more printed functional layer(s) may be varied in order to vary the tensile strength of the portion. Moreover, the portion of the first layer that is functionally printed may, e.g., be precisely controlled by isolated layer areas or gaps. Combining these variations with the minimum value of the elastic first layer allows the tensile strength of the portion to the adjusted nearly continuously to a desired value. By printing several layers, the tensile strength of the portion may also be increased.

In other embodiments, the tensile strength of a portion comprising one or more printed functional layers may be formed so that, for an elastic strain of 50%, a force of 10-100 N is applied over a width of 1 cm. An elastic strain of 50% may also be achieved when the tensile force is applied in the range of 30-60 N.

In some embodiments, the tensile strength of the portion is at least doubled when compared to the first layer that is not printed. In certain embodiments, the tensile strength is increased at least five times. In additional embodiments, the tensile strength is increased by a factor of 10.

In addition, in some embodiments, the elasticity of the printed portion, at least up to a relative extension of 30%, and further up to a relative extension of 50%, is substantially linear, e.g. the relative extension is directly proportional to the applied force. The curves shown in FIGS. 4a and 4b are characterized, e.g., by a linearity of 50% and 40%, respectively, in terms of relative extension. In some embodiments, this linearity may be used to provide a shoe with improved wearing comfort. According to the particular shape and size of the foot, the elastic portion that comprises the elastic second layer may adapt to the foot of the user. Thus, it expands to a varying extent in various regions. Due to the linearity of the elasticity of the second layer described above, however, further deformation, for example caused by an impact during running, is independent from the extent to which the second layer has already been stretched. Thus, additional extension caused by a particular additional force is of the same size—independent from the extension that has already been caused by the adaptation to the foot of the user of the shoe. Thus, the different regions that have adapted to the foot of the user, i.e. stretched, to a varying extent still exhibit the same desired original elasticity. Due to its linearity, the elasticity of the elastic portion may therefore simultaneously be optimized for the various possible exact shapes and sizes of a foot.

The printed second elastic layer made of poly-THF-based polyurethane dispersion is further characterized by its durability. On the one hand, the elasticity of the layer is maintained permanently despite the strong strain of up to 50% and without tearing, deformation, or losing its properties in other ways. In some embodiments, the functionally printed portion returns into its original state, even after multiple applications of a relative strain of 50%, as soon as the application of force is stopped. Thereby, an undesired widening of the printed portions may be avoided. On the other hand, the degree of elasticity may generally be maintained. After a first strain, the relative strain substantially shows the same characteristics after several relative strains of 50%. Thus, all properties in terms of elasticity may be permanently preserved. In this way, wearing out of the second layer is prevented. In some embodiments of the mentioned shoe, wearing out of the portion is avoided.

In addition to the particular mechanical properties, the printed second layers made from poly-THF-based polyurethane dispersion may also comprise various further advantages.

Portions printed with a second layer made from poly-THF-based polyurethane dispersion may endure washing processes without significant loss of functionality. This feature provides a particular longevity of the portions and thus of the correspondingly embodied uppers.

In addition, the poly-THF-based polyurethane dispersion is water-based. Thus, the use of solvents for printing, which are expensive and may be harmful to the environment or hazardous to the health, can be eliminated. Therefore, a more cost-effective, environmentally friendly and less toxic manufacturing process may be achieved. In addition, elaborately washing the portion after printing the second layer is unnecessary.

Further, color pigments may easily be added to the layers of poly-THF-based polyurethane dispersion. Thus, first layers may be printed with second layers comprising a variety of colors. Moreover, both matt and high-gloss second layers may be utilized. Thus, the portion may be embodied with a functional second layer that additionally comprises a desired optical appearance.

In addition, the layers of poly-THF-based polyurethane dispersion comprise a fine granularity. Therefore, the surfaces may be particularly even and smooth so that an improved appearance may be achieved and also multiple printing of several layers on top of each other can be carried out. Use of liquid dispersion may provide surfaces having a suitable coarseness and microstructure.

The printing of a functional second layer on a first layer for a portion of a shoe according to the present invention comprises a variety of printing methods. In some embodiments, the functional second layer is directly printed on the first layer. In these embodiments, no additional waste is created, such as the transfer layer generated with transfer printing methods. Moreover, the fabrication step of transferring may be eliminated and, thus, the production may be carried more quickly and efficiently. Moreover, possible defects or imprecisions that may occur during the transferring step are avoided.

In certain embodiments, the second layer is printed from poly-THF-based polyurethane dispersion, to which 1%-5% Desmodur is added. In certain embodiments, 2% Desmodur may be added. According to some embodiments, the poly-THF-based polyurethane dispersion that is used for printing comprises a viscosity in the range from 2000 mPa·s to 3500 mPa·s, and may be approximately 2800 mPa·s. Due to this viscosity, the dispersion is particularly suitable for use as printing substance.

In some embodiments, the functional second layer is printed by means of a screen printing method. In certain embodiments, an automated screen printing method is used. To this end, the printing agent is pressed through a finely woven printing mesh. The mesh is made larger or smaller in different areas depending on the layer that is supposed to be printed so that more or less of the agent or no agent at all penetrates the mesh. Thus, layers with variable thicknesses, but also fine structures, may be printed. Screen printing methods are characterized by the fact that in particular when large lot sizes are used, cost-effective production may be achieved.

In some embodiments, the first layer is heated to 150° C. for three minutes prior to printing in order to pre-shrink the first layer. Alternatively or additionally, the pattern of the material used for the upper may be selected to be one size too small for the last in combination with which the upper will be used, in order to provide a pre-strained upper. The printed functional second layer may, in certain embodiments, comprise one or more sub-layers. In embodiments in which the second layer comprises several sub-layers, the individual sub-layers are dried after each single print in a flash dryer. The duration of the drying process, in some embodiments, is about ten seconds. After the last sub-layers required for a functional second layer has been printed, a further flash drying process may not be carried out. Instead, the functional second layer may be cured. In some embodiments, the second layer is cured at about 140° C. for about six minutes. The thickness of the layer and the number of sub-layers may modify the functionality, e.g., the elasticity of the second layer. Moreover, the elastic properties of the printed layer may be controlled by varying the parameters used for curing.

In some embodiments, the second layer is directly printed by means of a rotation printing method or an automated rotation printing method. In additional embodiments, the second layer is directly printed via an ink-jet printing process. In other embodiments, the second layer may be directly printed with a meltable plastic granulate, wherein the granulate may subsequently be melted.

The printing enables a suitable design and manufacturing process of the functional second layer. The printing enables a particular precision when embodying the second layer.

The thickness of the layer may be controlled very accurately. In particular, very thin layers may be printed so that the weight of the corresponding shoes is minimized. By printing several sub-layers, the thickness of the second layer may be varied, while only requiring minimal changes to the production process. This enables a particularly cost-effective production of shoes with different functionalities.

The lateral precision of the printing process may be quite high. Thus, small structures or structures with low distances from each other may be manufactured in a suitable manner. In total, this process results in a high degree of design freedom with respect to the creation of the portion of the shoe.

Furthermore, printing methods may have a high degree of automation. Moreover, no excess or waste material may be produced. Also, printing methods enable a high degree of flexibility. For example, the design of the second layer may be changed without large modifications to the production process. In some cases, only a new printing pattern, e.g. in electronic form, is needed to modify the design of the second layer, and no further steps in the production process need to be changed. In particular, the first layer does not have to be adapted. Thus, a particularly cost-effective production is enabled. Moreover, this flexibility may allow a customized production. For example, shoes adapted to individual customers may thus be manufactured in a cost-effective way. For example, the functional second layer of the portion of the shoe may be adjusted to the particular needs of individual customers. This adjustment may even be done in a local store, depending on the availability of a suitable printer. A different printing pattern or perhaps even only a different thickness of the layer, e.g., according to the weight of the customer, may need to be printed on the first layer. Using printing methods, this modification may be carried out without extensive efforts so that each manufactured portion may carry an individual second layer.

Further, by means of printing, the second layer may be deposited on the first layer at room temperature. This feature provides a simple, safe, less error-prone, and less energy consuming production.

In some embodiments, the second layer may be arranged only in selected zones of the portion. Zones at which the second layer is arranged comprise at least one modified mechanical property.

Moreover, in certain embodiments, the second layer may be more or less breathable than the first layer. In some embodiments, the breathability of the portion in those zones where the second layer is arranged is lowered. In other embodiments, the breathability of the portion is increased in those zones where the second layer is not arranged.

FIG. 3e illustrates embodiments that are optimized for the activity of running. Here, the second layer provides larger elastic restoring forces than the first layer, and the second layer is only arranged in selected zones 352. In some embodiments, the first layer is breathable. The work piece 301 comprises several zones 361 in which the second layer 350 is not required and thus not arranged, in order to reduce weight and costs of the material. In particular, zones 361 may be provided with increased tensile strength. Zones 361 may be arranged in the area of the instep 396, where a flexible adaptation to the specific shape of the foot may be desired. Moreover, zones 361 may be arranged in the area 397 between toe joints and midfoot joints where an increased flexibility for supporting flexing of the foot may be desired.

As illustrated in FIG. 3e, the functional second layer 350 may be deposited substantially area-wide in zones 351. In such zones 351, the elasticity of the portion 310 is substantially determined by the elasticity of the second layer 350. Thus, increased strength stability is provided in these zones. The zones 351 may be correspondingly located in positions where increased stability is desired. As can be seen from FIGS. 3e, 3b and 3d, a need for increased stability is present in zones 392, which are directly adjacent to the sole 320, or in zones 391, which are directly adjacent to the collar 340. Furthermore, such zones may be arranged in the toe area 393 or in the heel area 394 or in the area of the lateral and medial midfoot joint 395. Extended regions have for example characteristic dimensions of 1-10 cm. However, the design of the zones may be versatile and FIG. 3b, 3d, 3e merely show examples thereof.

By including gaps 353, the strength of such zones 351 may be reduced in a deterministic manner. The strength is reduced as the area comprised by the gaps 353 is increased. Thus, the elasticity of the second layer 350 may be locally modified deterministically and gradually so that an optimized adjustment to the respective desired profile requirements may be achieved. Moreover, the material that is needed to form the second layer 350 may be reduced to a minimum due to the fact that it can be deposited deterministically and locally and does not have to be deposited completely area-wide. A shoe 300 with correspondingly improved adjusted functionality will therefore be lighter and cheaper.

Printing the second layer 350 may be desirable in certain embodiments, since it allows formation of small gaps 353. For smaller minimum gap sizes, more even transitions may be achieved because the difference between the maximum elastic tensile strength of an area-wide layer and the next possible lower elastic tensile strength of a layer with the smallest gap size is smaller. In some embodiments, such as work piece 301, the gaps 353 have typical dimensions of 1 mm, and at least one gap may have dimensions of less than 1 mm. However, in these embodiments, gaps 353 are also included, which comprise dimensions smaller than 0.5 mm. By means of this particularly small gap size, the tensile strength of the second layer 350 may be lowered with respect to its maximum value in a particularly even manner.

Further, the printing enables the use of gaps 353 in special shapes without being limited by the type of the production method. Gaps 353 may be round, triangular, quadratic, parallelogram-like, trapezoid-like, rectangular, polygonal, or any other suitable shape. Depending on the characteristics of the loading that is expected, different shapes may be desirable in certain embodiments. For example, the shape of the gaps 353 may be adapted to the expected force lines. For example, the gaps 353 may be shaped so that the edges of the gaps 353 are arranged preferably parallel to the occurring forces. Thus, the effect and the lifetime of the second layer 350 can be additionally increased.

By incorporating gaps 353 into the second layer 350, the breathability of the portion 310 may be increased.

Referring to FIG. 3e, the zones 352 may also comprise several isolated layer areas 354. In particular, these zones 352 may be selected according to the mechanical loading that occurs when using the shoe 300. If the isolated layer areas 354 are arranged more densely, the restoring force that occurs in the respective zone 352 is stronger and, thus, the tensile strength is increased. Zones that require lower restoring forces may accordingly be entirely free of the functional second layer 350. The zones 352 with isolated layer areas 354 enable gradual transitions between zones without a second layer 350 and zones 351 with an area-wide second layer 350, potentially comprising gaps 353.

In the work piece 301, isolated layer areas 354 typically comprise dimensions of 1 mm to 2 mm. However, some embodiments, such as work piece 301, also comprise isolated layer areas 354 with dimensions smaller than 0.5 mm. Other embodiments may comprise isolated layer areas 354 with dimensions ranging from 0.5 mm to 2 mm. In further embodiments, isolated layer areas 354 that have dimensions smaller than 0.5 mm may be used exclusively. Depositing such small isolated layer areas 354 is enabled by means of printing. The distances between isolated layer areas 354 typically comprise around 2 mm. In particular, the distances may also be smaller than 2 mm, and may even be smaller than 1 mm. However, any suitable distance, including larger distances, may be used. As explained above, in the context of the gaps 353, the isolated layer areas 354 may comprise any suitable shape and may thus be adapted to the characteristics of the force lines.

Figure 5:
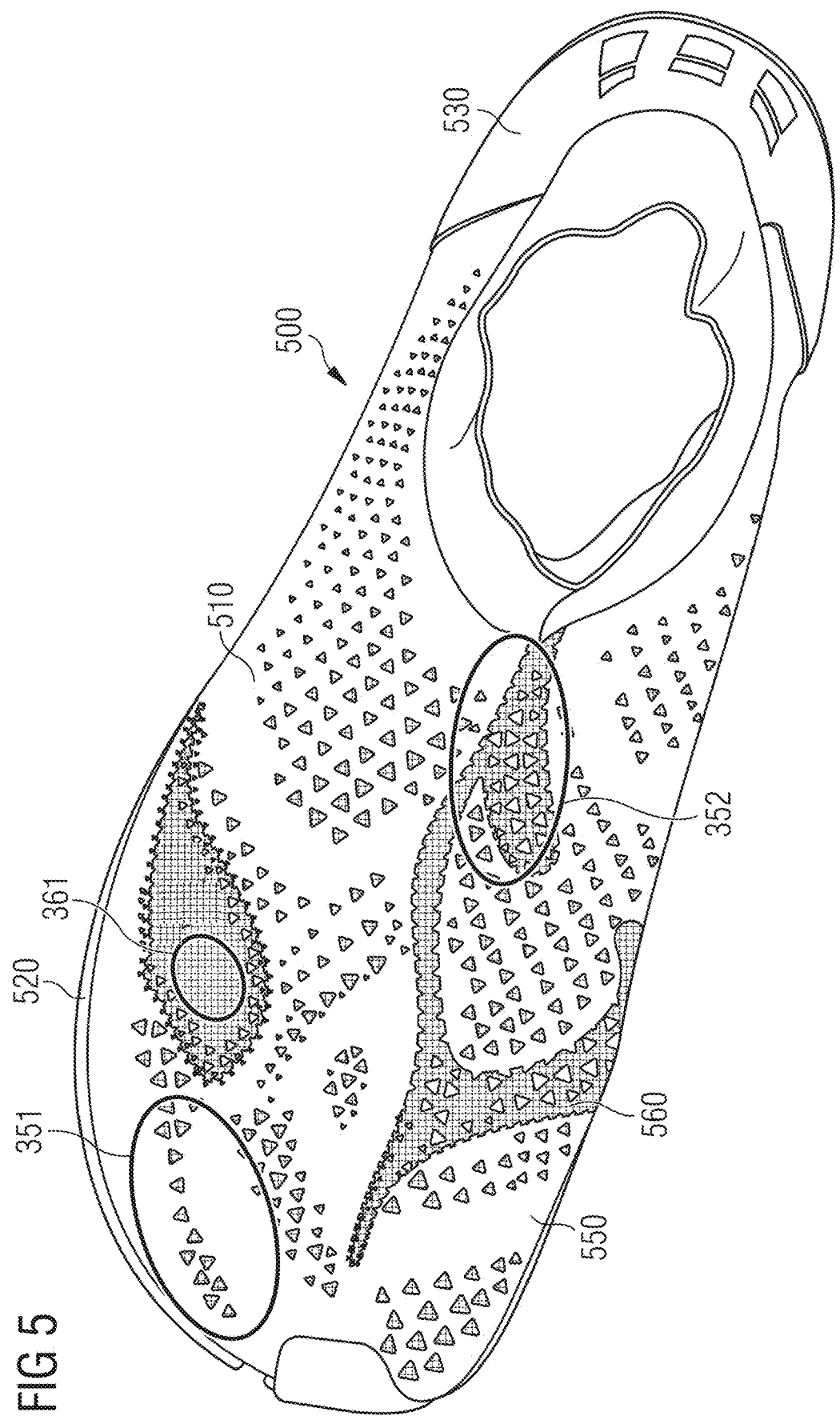
FIG. 5 is a top view of a shoe according to certain embodiments of the present invention, wherein the shoe comprises a first layer that is printed directly with a functional second layer, wherein the functional second layer comprises zones that are printed substantially area-wide, and zones with isolated layer areas.

Some embodiments, such as a shoe 500 as illustrated in FIG. 5, comprises, in addition to the portion 510, a heel section 530 and a sole 520. However, a variety of other embodiments are also possible. Other embodiments may be formed without or only with selected ones of the aforementioned parts. Further embodiments may also comprise further parts, such as a shoe-lace section or hook-and-loop fasteners or an enforced collar 340. In further embodiments, the upper of the shoe 500 may be perforated. Thus, the weight of the shoe 500 may be further reduced and its breathability may be further increased.

In the shoe 500 of FIG. 5, the portion 510 substantially comprises the entire upper of the shoe 500, except for the heel section 530. In other embodiments, the portion 510 may comprise other parts of the upper. Further embodiments relate to other sports shoes, for example, football shoes, wherein a second layer 550 is arranged on a first layer 560 so that the elasticity of the portion 510 is modified according to the typical loading that occurs in the specific sports type, e.g. playing football.

The printed functional second layer 550 may comprise various thicknesses in various embodiments. The thickness of the second layer 550 may easily be varied by means of printing methods. Thus, the degree of functionality of the second layer 550, e.g., its elasticity, may be adjusted by varying the thickness of the second layer 550 so that the second layer 550 may be adjusted, e.g., to accommodate varying body weights. Furthermore, the thickness may be varied within different zones of the portion 510, so that the functionalities of the portion 510 are modified gradually. For example, with a gradual modification of the elasticity by means of varying thickness of the second layer 550 in different zones, unpleasant bruises may be eliminated by avoiding sudden changes in the elasticity.

Figure 6A:
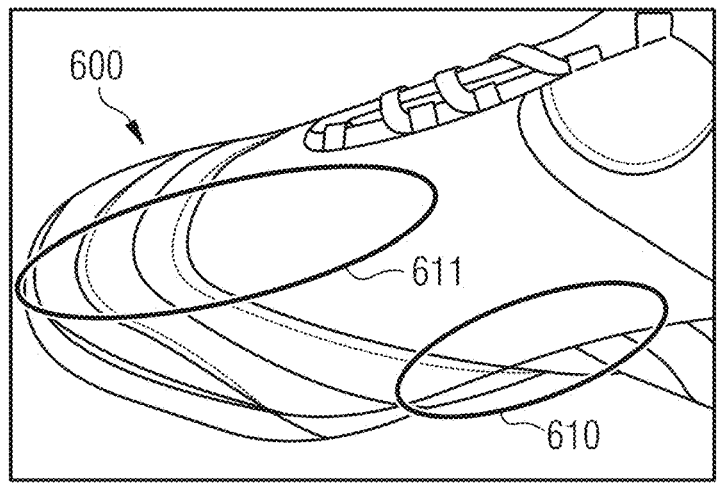
FIG. 6a is a side view of a football shoe showing locations of printed zones according to certain embodiments of the present invention.
Figure 6B:
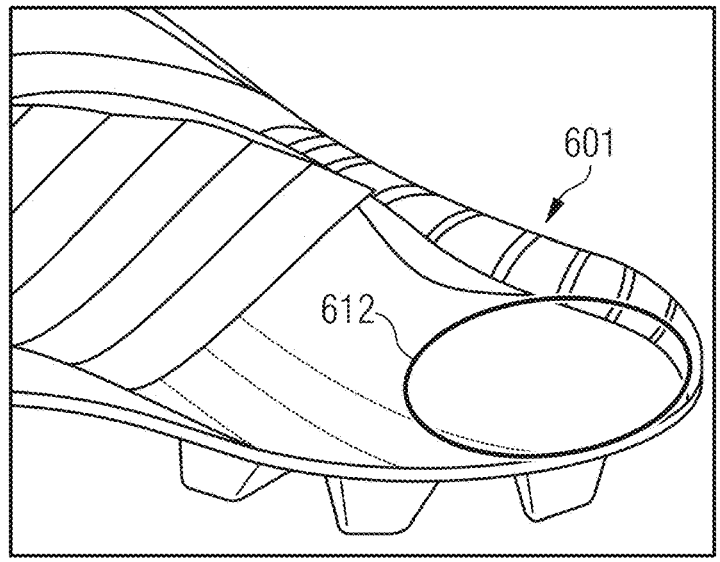
FIG. 6b is a side view of a football shoe showing locations of printed zones according to certain embodiments of the present invention.
Figure 6C:
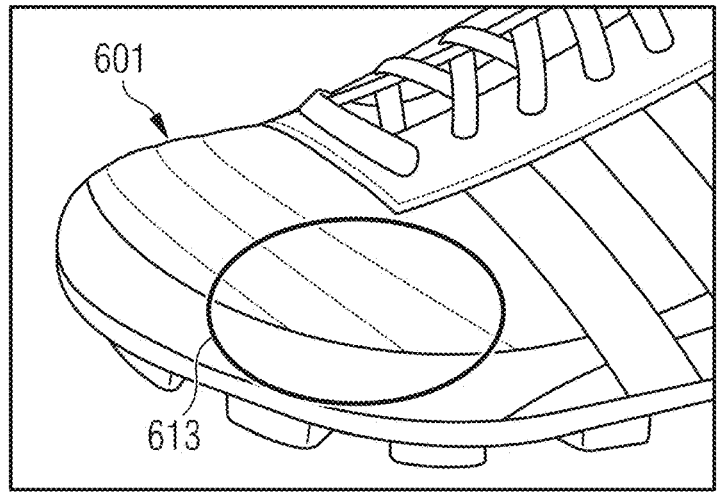
FIG. 6c is another side view of the football shoe of FIG. 6b.

Certain embodiments of a football shoe 600 and 601, such as the embodiments shown in FIGS. 6a-6c, have different functional zones. In some embodiments, e.g., zones of a football shoe particularly used for the first touch, shooting at the goal, for dribbling, for crossing or for passing, may be provided with different desired functionalities.

In some embodiments, the printed functional second layer is arranged so that the cushioning is increased within a portion. Preferably, the second layer is arranged in zones which are preferably used for the first touch so that the cushioning within that area of the portion is increased. For instance, zone 610 is preferably arranged at the medial faces of the shoe, which is often used for the first touch. Thus, the rebounding force that drives the ball away from the shoe when trying to control the ball is reduced in that zone, and an improved control of the ball is achieved.

In further embodiments, the functional second layer comprises elasticity in the direction perpendicular to the plane of the portion. Thus, instead of cushioning the ball, in some embodiments, the force transmission between the ball and the foot may be increased by means of the elasticity perpendicular to the plane of the portion, so that more powerful shots may be achieved. This feature may be particularly advantageous in zones that are preferably used for shooting at the goal, such as for example in zone 611 in FIG. 6a.

In further embodiments, the stiction of the portion may be modified by means of the second layer. Thus, selected zones may be adjusted so that their stiction properties are optimized according to their intended use. In certain embodiments, for example the various zones of a football shoe discussed above may be provided with different stiction. These zones may comprise the lateral instep zones that are preferably used for carrying out crosses. FIG. 6b shows a football shoe 601 having such a zone 612. In zone 612, the increased stiction enables an improved control of a cross, for example with more spin. Also, zones around the tip of the shoe that are preferably used for dribbling may be provided with increased stiction so that the ball may be handled in an improved manner. For example, zone 613 may be arranged around the tip of the shoe, which, e.g., may be seen in the football shoe of FIG. 6c. On the other hand, zones 611 that are used for powerful shots may be provided with reduced stiction in order to achieve a better force transmission.

The functionalities of the printed second layer mentioned with reference to a football shoe may also be used for a wide variety of different types of shoes.

Besides the mechanical properties already mentioned, the printed second layer may change a wide variety of other mechanical properties of the portion. For instance, the elasticity, the cushioning, the stiction, the abrasion resistance, the cut resistance, the wind resistance or the water resistance of the portion may be changed. In this way, it is possible to provide a wide variety of different functionalities.

In certain embodiments, several functional layers may be printed. The different printed functional layers may be made of different materials. In this way, the above mentioned different functionalities may be easily combined.

In other embodiments, one printed functional layer may, e.g., control the elasticity of the portion, while a further printed functional layer may control the cushioning, and yet another printed functional layer may control the stiction. Other embodiments may provide only part of the above mentioned and/or additional functionalities by the printed layer(s). Moreover, the respective layers may comprise different or the same colors. Thereby, a specific functional portion may also be combined with a specific optical appearance.

On the one hand, multiple printing and the advantages arising therefrom may be achieved at least in part via the printing method, i.e., by depositing substantially flat and thin layers. In this context, the use of printable, highly functional material, may provide the functionality, e.g. elastic strength, required for a shoe, even when formed as a thin layer. In some embodiments, a printed functional layer and possibly a transition between the printed functional layer and a zone of the first layer that is not printed on is sufficiently flat, so that a further continuous printing thereon is possible. In some embodiments, the printed functional layers may comprise a total thickness ranging from 0.03 mm to 1 mm, which may be is less than 0.5 mm, and may be approximately 0.3 mm. Moreover, in certain embodiments, the surfaces of the individual functional layers are configured so that further functional layers may be printed thereon, in particular so that further functional layers adhere to the respective layers. Thus, eventually separate, non-overlapping or partly overlapping functional layers, but also layers that are adjacent to each other or that are formed so that they fit into each other, may be printed on the first layer sequentially, on top of each other, or next to each other.

Through the printing process, various functionalities may be provided in one manufacturing step. Transfer times between different machines, adapting the different machines to each other, as well as correspondingly inserting and removing the work pieces may be eliminated.

Figure 7A:
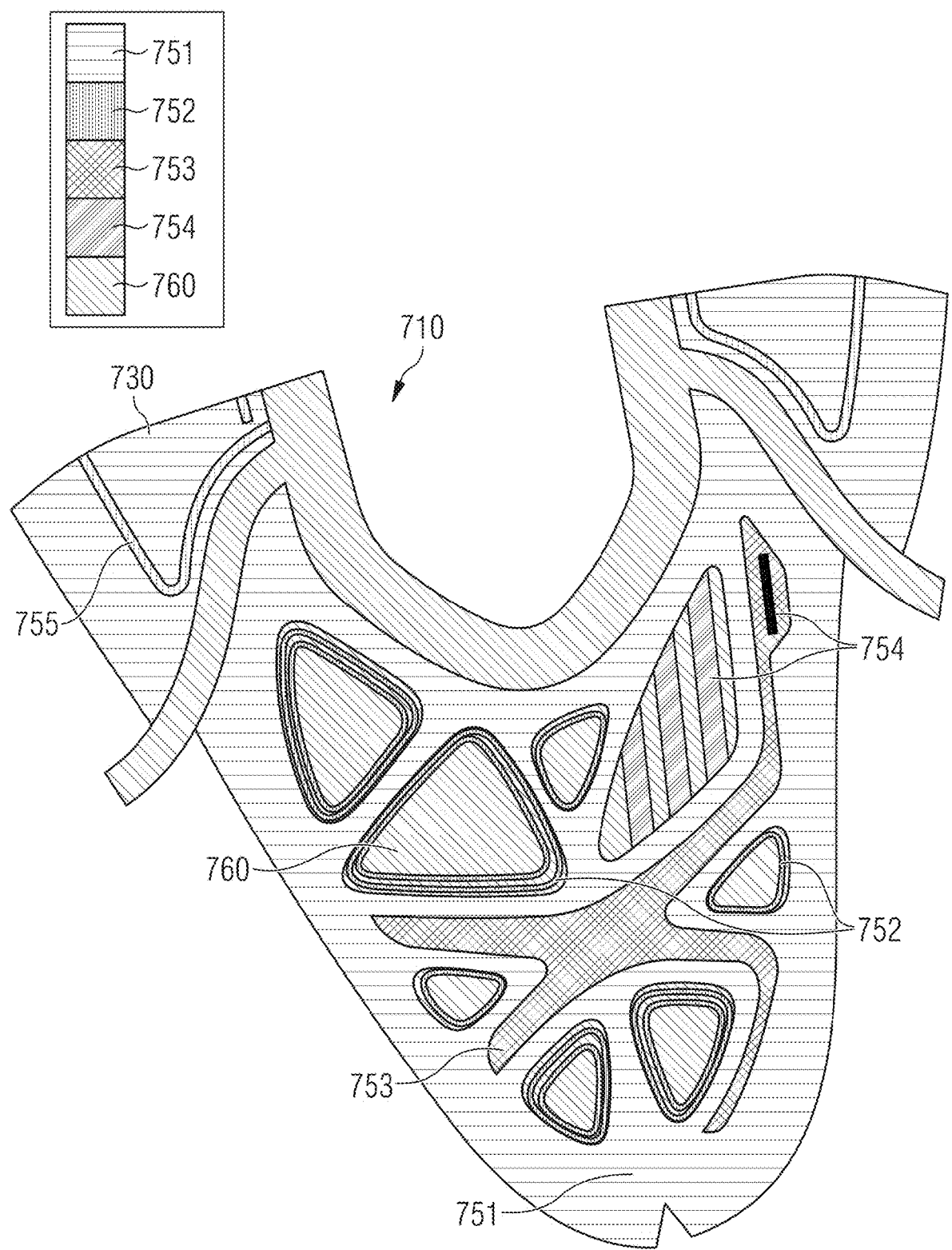
FIG. 7a is a top view of a first layer directed printed with several functional layers according to certain embodiments of the present invention.
Figure 7B:
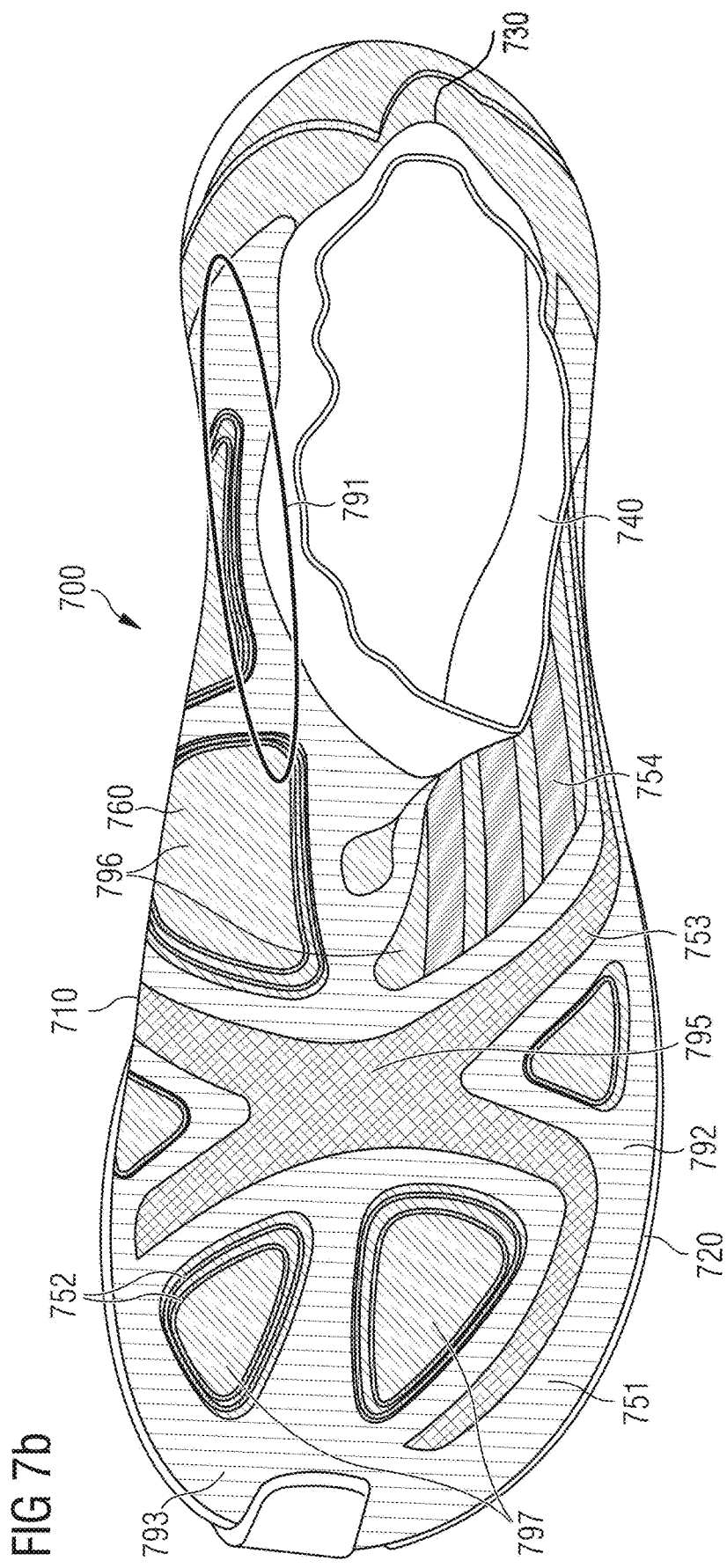

In certain embodiments, such as the embodiments illustrated in FIGS. 7a and 7b, a shoe 700 may comprise a sole 720 and a portion 710 having a first layer 760 and three functional layers 751, 752, 753. The portion 710 may also comprise a heel section 730 so that the latter does not have to be manufactured separately. Also, the heel section 730 may be functionally printed. In particular, heel details may be printed. In the shoe 700, in particular via the second printed layer 752, a line-shaped element 755 may be printed onto the heel section 730, which provides an additional stability to the heel section 730, so that the latter does not have to be additionally enforced. More specifically, this line-shaped element 755 may stabilize the heel section 730 along the circumference of the shoe 700 without constricting the heel perpendicular to this direction. In other embodiments, the heel section 730 of the portion 710 may also be enforced by means of additional elements that are arranged thereon.

The elastic functional second layer 751 may be arranged substantially area-wide in zones 791 around the collar 740, as well as in zones 792 around sole 720 and in zones 793 in the toe area. Thereby, the stability of the portion 710 may be increased in these zones. In zones 797 of the toe joints and on the lateral areas and the instep zone 796 of the shoe, the functional second layer 751 may be punctuated, in order to support the flexing movement of the foot and to improve the adaptation of the portion 710 to the foot.

In the respective transition areas of the zones that are fully printed with the second layer 751 and the zones of the first layer 760 that are not printed, the functional third layer 752 may be arranged. This layer 752 contributes to a continuous transition between the zones.

The functional fourth layer 753 may be arranged from the lateral to the medial midfoot joints and may provide for an improved stability in this zone of the portion. The additional printed layer 754 may also further provide for a desired optical appearance.

In further embodiments, the respective functional layers 751, 752, 753 may change different mechanical properties of the portion. In particular, they may be made of different materials or comprise different thicknesses. In additional embodiments, the portion 710 may only comprise one of the layers 751, 752, 753, 754 or layers selected therefrom or additional functional layers.

Figure 8:
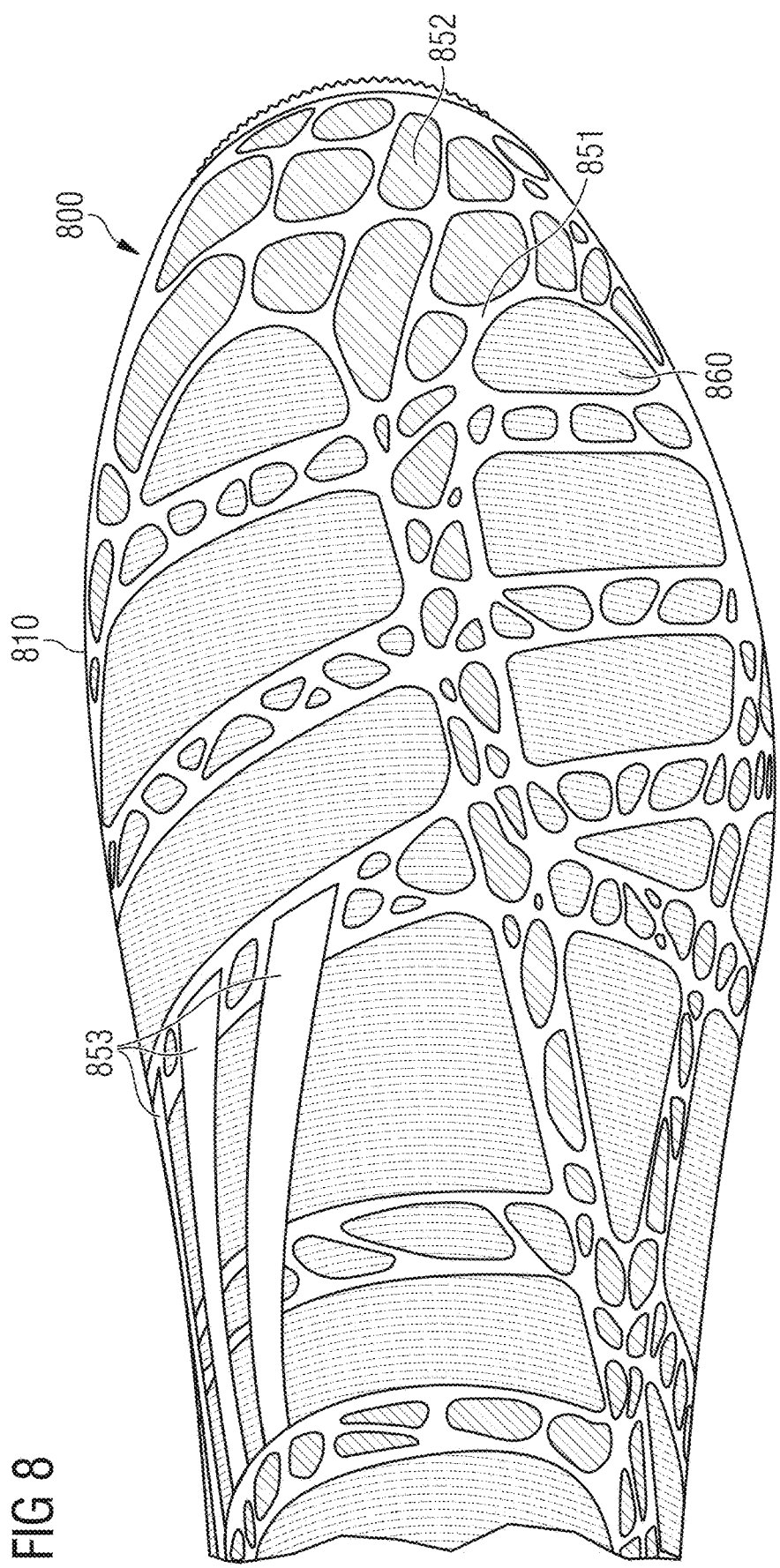
FIG. 8 is a top view of a shoe according to certain embodiments of the present invention, wherein the shoe comprises a portion with first layer and several directly printed functional layers.

FIG. 8 illustrates further embodiments of a shoe 800. The shoe 800 comprises a portion 810 with a first layer 860 and several printed functional layers. An elastic second layer 851 may be printed with line-shaped structures that correspond to the main force lines of the loading that occurs during usage. Moreover, the second layer 851 may be printed in zones adjacent to the sole and the collar. The zones of the functional second layer 851 are, according to the desired tensile strength, provided with gaps that may comprise various shapes. Along the two lines, which may extend along the longitudinal direction of the shoe and in the zones that are adjacent to the collar or the sole, a further elastic layer 852 may be printed, exactly filling the gaps of the layer 851. This leads to a continuous elastic layer in the aforementioned zones in order to provide an increased stability in those zones. In the shoe 800, the layer 852 comprises a different color than the layer 851. Moreover, the shape of the layer 852 may be exactly adapted to the gaps of the layer 851. Thus, a desired optical impression may be achieved, in particular the impression of multi-color areas and/or lines. In addition, the shoe 800 may be printed with a further layer 853.

The functional layers 851, 852, and/or 853 may be adjusted relative to each other to achieve a composite layer comprising a predetermined global functionality of all layers. By means of several layers, the functionality of the shoe 800 may thus be optimized, wherein at the same time, a predetermined optical impression may be achieved. The materials used for the various layers may comprise the same or different mechanical properties. The different layers may comprise the same or different thicknesses.

In the above shoes 700 and 800, it was illustrated that, by means of printing one or more functional layers on the first layer, substantially an entire upper of a shoe may be manufactured, wherein several functionalities may be taken into account and a variety of desired optical impressions may be achieved. The printing of functional layers on a first layer may, however, also be configured so that it may be combined with other manufacturing methods. For example, the printing may be combined with depositing coatings, for example having additional water proofing effects.

Figure 9:
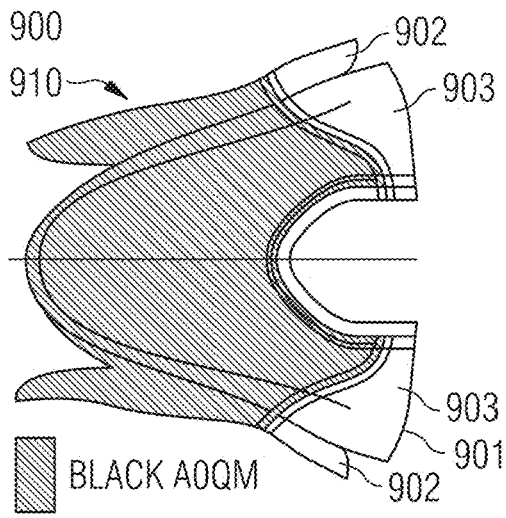
FIG. 9 are top views illustrating direct printing of a first layer with several functional layers according to certain embodiments of the present invention.
Figure 9:
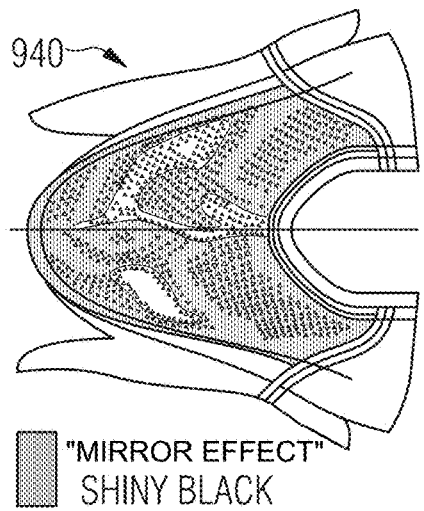
Figure 9:
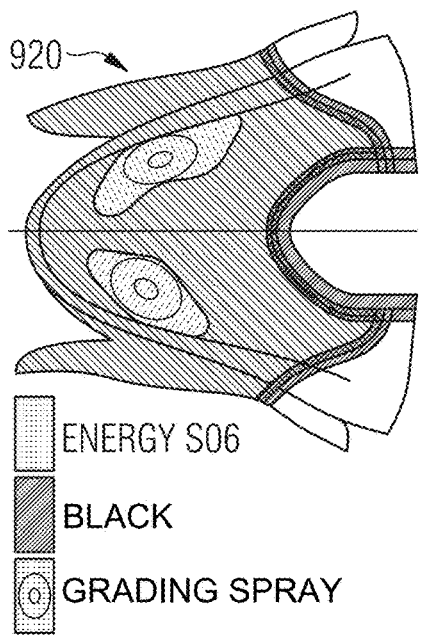
Figure 9:
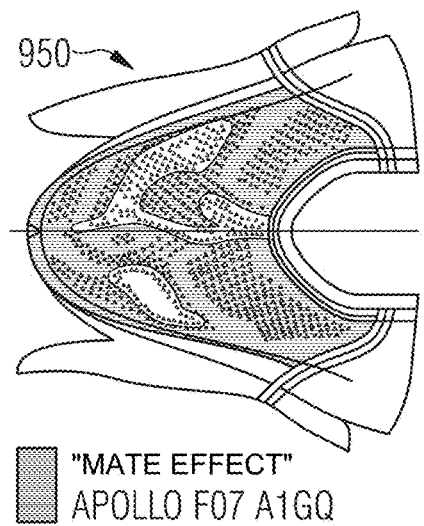
Figure 9:
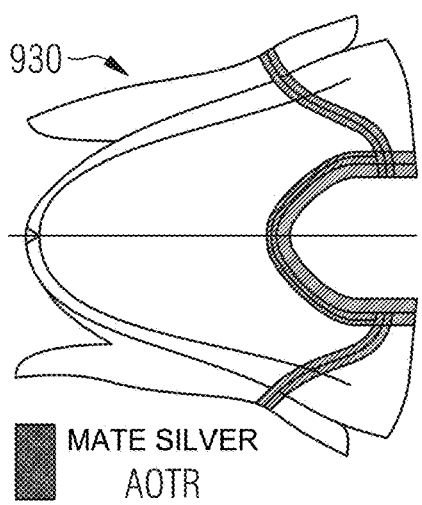
Figure 9:
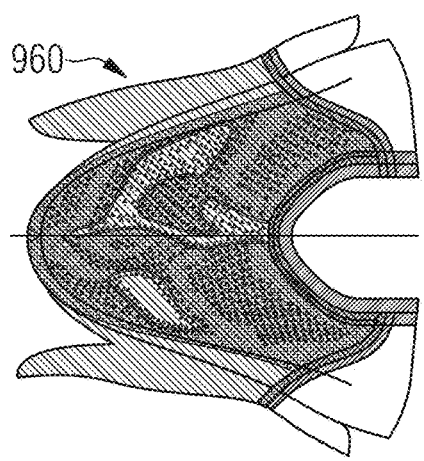

FIG. 9 shows the various layers being applied during the course of printing 900 of a portion 901 of a shoe with four printed layers. The portion 901 comprises heel sections 903 and sections 902 that are configured for attaching the portion 901 to a sole. In step 910, a black ground layer is printed. The first black printed layer is sprayed with a grading spray in step 920. The properties of the surfaces of the printed layers allow both spraying on these surfaces and further printing on sprayed surfaces. In step 930, a further element for achieving a desired optical appearance is printed. This element is, in particular, printed on the zone that was sprayed in step 920. In step 940, a black high-gloss layer with a first pattern is printed. In step 950, finally, a functional layer is printed that comprises an increased elastic strength. The layer is printed with a second pattern, the boundaries of which are slightly decreased compared to the first pattern of step 940. The boundaries of the second pattern in step 950 may be located about 1 mm within the boundaries of the first pattern of step 940. Thus, the high gloss layer can be seen beneath the functional layer. Step 960 illustrates the finished product. Thus, a three-dimensional optical appearance of the different printed zones may be achieved.

In addition to the combination with a grading spray, the functional printing may also be combined with other production methods. In some embodiments, a portion of an upper of a shoe comprises a first layer that is provided with an elastic element, e.g., a stripe of thermoplastic elastomer (TPU). In a further production step, the first layer is additionally functionally printed. Thereby, known production methods for elastic elements may be combined with the advantages of functional printing. In certain embodiments, an elastic element, e.g., a TPU stripe is printed with one or several functional layers. Thereby, the elasticity of the elastic element may be specifically and locally modified. Moreover, the elasticity of the portion may be varied locally, even in zones where an elastic element has already been attached. Alternatively or additionally, other mechanical properties of the portion may be changed in zones that already have an elastic element attached thereto, as well as in zones that do not comprise an elastic element. In this context, regular upper materials (mesh, textiles, leather, etc.) may additionally be attached to the sock-like upper (e.g. external toe caps, a heel cap or medial/lateral stiffening elements which are connected to the lacing and may be fastened by means of the lacing).

In some embodiments, one or more elastic elements may be arranged on the portion. These embodiments may also, as already explained, be combined with functional printing. In particular, by printing one or several area-wide functional layers or isolated layer regions, the elasticity of the portion in zones that are located between the elements may be controlled. In this way, sudden transitions between the elements may be avoided and smooth transitions may be provided.

Figure 10A:
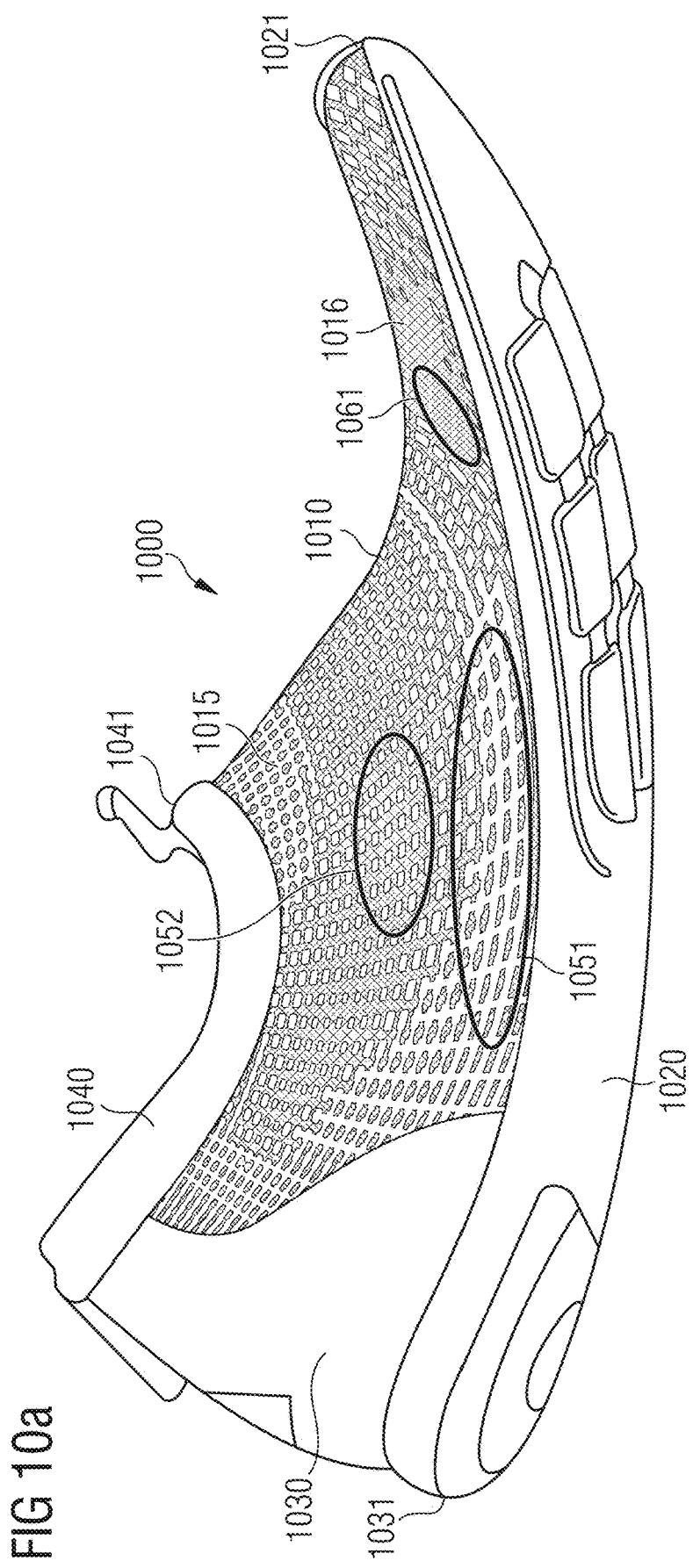
FIG. 10a is a side view of a shoe according to certain embodiments of the present invention, wherein the shoe comprises a directly printed functional second layer.
Figure 10B:
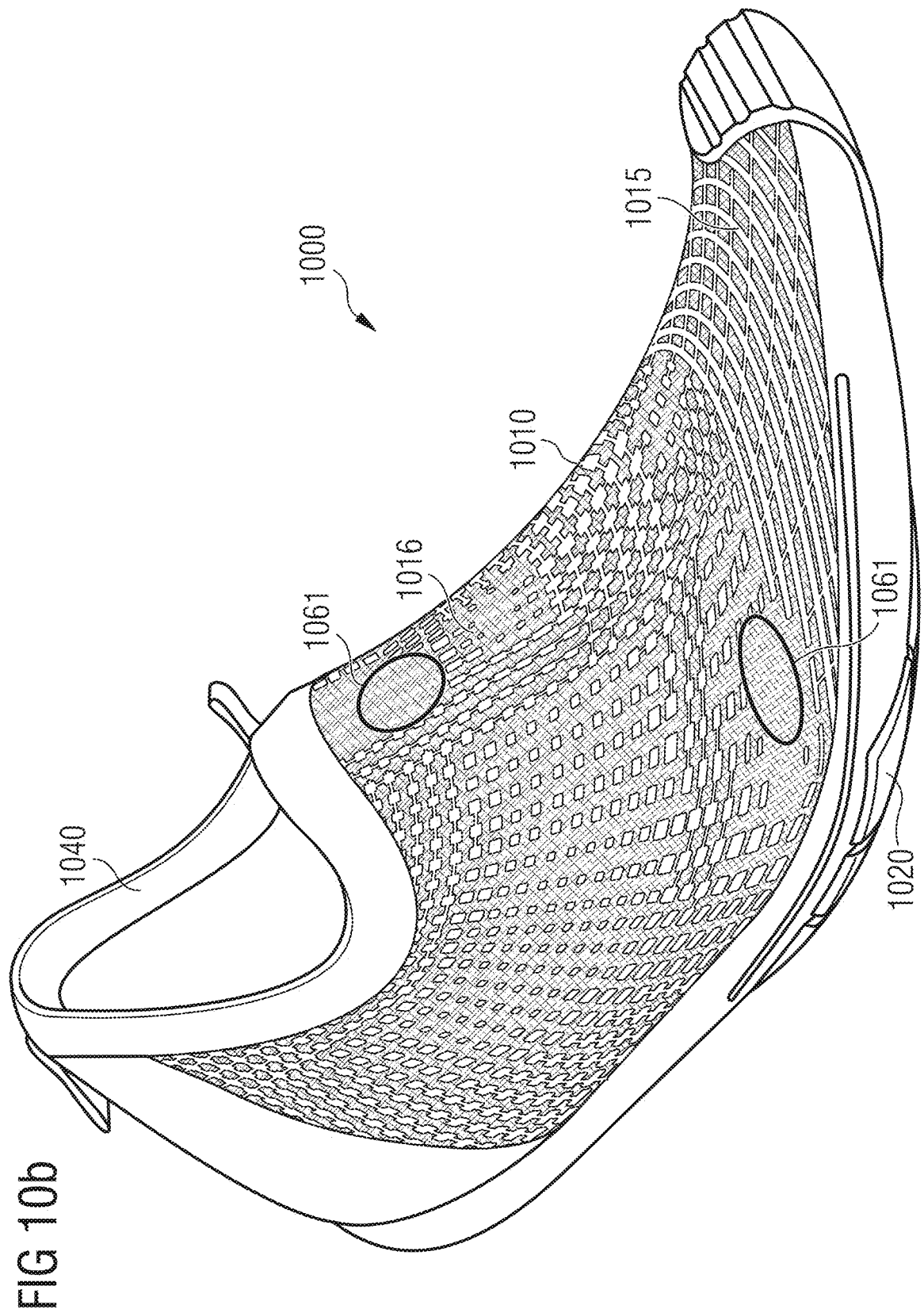

FIGS. 10*a*-10*c* show side, front, and top views of shoes 1000 and 1001 with portions 1010 and 1011, respectively. As can be seen from FIG. 10*a*, the shoe 1000 comprises a sole 1020. The upper of the shoe 1000, except for the heel section 1030 and the collar 1040, substantially comprises the portion 1010. The portion 1010 comprises a first layer 1016. The first layer 1016 may include an elastic polyester woven mesh. In other embodiments, other elastic or inelastic materials may be used. The portion 1010 may also further comprise a printed functional second layer 1015. The second layer 1015 may be made from elastic material. In embodiments that comprise an elastic first layer 1016, the elastic second layer 1015 may exhibit larger elastic restoring forces than the first layer 1016. The second layer 1015 may, for example, comprise silicon, rubber, and/or polyurethane. In certain embodiments, the second layer 1015 may be made from a poly-THF-based polyurethane dispersion, so that, as already described, a second layer 1015 with desirable elastic properties may be provided.

The portion 1010 may comprise at least one dimension that is stretched when using the shoe 1000. The portion 1010 may impart a curved shape to the shoe 1000 from the tip 1021 to the upper side of the heel section 1030. In certain embodiments, the tip 1021 is elevated by 2-10 cm with respect to the ground, and may be elevated by about 5-6 cm with respect to the ground. In certain embodiments, the tip of the heel 1031 is elevated by 1-5 cm with respect to the ground, and the elevation of the tip of the heel 1031 may be approximately half of the elevation of the tip 1021.

When using the shoe 1000, the foot of the user applies pressure against this curved shape, and the portion 1010 tends to stretch along the longitudinal direction so that the tip 1021 and the tip of the heel 1031 are pressed toward the ground. Thus, the shoe 1000, in total, stretches along the longitudinal direction. The elasticity of the portion 1010 opposes this action. Thus, the portion 1010 adapts to the foot of the user so that a comfortable fit may be achieved. If the user has a slightly longer foot, the portion 1010 and thus substantially the upper of the shoe 1000 will stretch further along the longitudinal direction of the shoe 1000. Thus, the shoe 1000 will become slightly longer in the longitudinal direction so that it, in fact, adapts to the foot of the user. If, in contrast, the foot of the user is slightly shorter, than the portion 1010 will extend to a lesser extent so that the length of the shoe 1000 in longitudinal direction will be slightly smaller and, again, the shoe 1000 adapts to the length of the foot.

By printing the functional second layer 1015, the shoe 1000 having certain parts that are configured to stretch to different extents may be provided. In particular, the elasticity of the portion 1010 may be configured so that the shoe 1000 adapts to the foot of the wearer in an optimized manner.

In certain embodiments, the portion 1010 is adapted so that its elasticity is anisotropic. As described above, the first layer 1016 may comprise anisotropic elasticity. The anistrophy may for example be provided by the structure of the mesh of the first layer 1016. The anisotropy is preferably achieved in a way that allows the first layer 1016 to be more stretchable in a longitudinal direction from the tip of the collar 1041 to the tip 1021 than in a lateral direction that extends perpendicular thereto. Thus, the adjustment of the shoe 1000 to the exact length of the foot of the user, as described above, may be improved because the shoe 1000 is more stretchable along the longitudinal direction. In the region of the front instep, a higher degree of stability may be achieved through the introduction of a larger tensile strength along the circumference of the shoe. Hence, the elastic properties in the front instep region of the portion 1010 may be optimized. Due to the shape of the portion 1010, the axes of anisotropy provided by the first layer 1016 may however be rotated at the side faces of the shoe 1000. For example, the direction of the mesh of the first layer 1016, which may provide the described anisotropy along the longitudinal and lateral directions of the shoe 1000 in the instep region, may deviate from the longitudinal and lateral directions at the side faces of the shoe 1000. The anisotropy which is provided at the side faces may thus not be ideal, or may even be undesirable.

By using a second elastic layer 1015, the elastic properties of the portion 1010 may also be optimized locally, for example, in the instep region and simultaneously at the side faces. In certain embodiments, the second layer 1015 may only be printed in specific zones of the first layer 1016. These zones may be printed substantially area-wide or may comprise isolated layer areas. Preferably, the second layer 1015 may be configured so that the elasticity of the portion 1010 in the direction along the circumference of the shoe 1000 differs from the elasticity of the portion 1010 in the perpendicular direction. In some embodiments, the first layer 1016 is elastic. In other embodiments, the first layer 1016 is anisotropically elastic, the second layer 1015 is characterized by larger restoring forces than the first layer 1016, and the second layer 1015 is configured so that the anisotropic elasticity of the first layer 1016 is adjusted to achieve a predetermined locally varying anisotropic elasticity. To this end, the areas in which the second layer 1015 is applied substantially area-wide, as well as the isolated areas, may be formed anisotropically. Thus, the functionality of the portion 1010 in a first direction may be made to differ from the functionality of the portion 1010 in a second direction. For example, an elastic layer area that comprises a larger dimension in a first direction than in a second direction may result in an increased tensile strength of the portion in the first direction compared to the second direction. By means of printing specific local structures, the anisotropy can specifically be locally adjusted.

In the shoe 1001, the second layer 1015 is arranged following a first structure, as can be seen from FIG. 10c. The structure follows lines 1055, which are arranged in a star-like manner and extend from the collar 1040 towards the sole 1020. The width of the elements of the second layer 1015 may progressively increase in the direction from the collar 1040 towards the sole 1020. The width of the elements may range from 2-12 mm. As shown in FIGS. 10a and 10c, the second layer 1015 may be applied preferably area-wide along zones adjacent to the sole 1020 or the collar 1040 since larger tensile strength is required in these zones. The extended zones may be provided with gaps, as already described in connection with other embodiments, which allow a precise control of the elasticity, as well as an increase of the breathability of the portion.

The zones 1051 that are printed area-wide, such as those zones adjacent to the sole or the collar or in the toe area, preferably comprise a width of 0.5-2 cm. Between the rim regions, i.e., in zones 1052, increased elastic restoring forces may not be required. Correspondingly, the second layer 1015 may be arranged less densely in those locations. In some zones 1061, a reduced elastic restoring force is provided to achieve an increased wearing comfort. In those zones, the first layer 1016 remains free of the second layer 1015. This may be the case in the zone of the upper instep (FIG. 10b) so that an increased extension of the portion 1011 is enabled in that location. As a result, putting on the shoe 1001 is facilitated and the wearing comfort is increased. Moreover, zones may be located above the phalanx proximalis of the great toe (FIG. 10a) and above the phalanx distalis of the little toe (FIGS. 10b, 10c) so that the rolling motion of the foot is not constricted. It may be desirable for certain embodiments, as already explained, to provide transition regions between the zones 1061 and the extended zones 1051 of the second layer 1015 by means of zones 1052 with isolated layer areas. Use of isolated layer areas provides for even control of the corresponding elastic properties. Hence, the elastic properties may be embodied in a particularly even manner without having any jumps, e.g. along the lines 1055, which are arranged in a star-like manner.

In addition, in the shoe 1001, as can also be seen from FIG. 10c, the second layer 1015 may be arranged according to a second structure. This second structure follows circular arcs 1056, which are arranged along the circumference of the shoe 1001 similar to contour lines. The second structure may provide precise control of the elasticity along the circumference of the shoe. The heights of the lines or the height of the elements that are arranged along the lines preferably include a range of 0.5-5 mm. As explained in connection with the first structure, zones with isolated layer areas may be combined with zones that are printed substantially area-wide. Particularly in the zone of the second layer 1015 adjacent the tip toe, the arcs are may be printed area-wide. Thus, a particularly high stability of the foot within the shoe 1001 can be achieved.

In order to follow both described structures, the individual elements of the second layer 1015 of the shoe 1001 may be adapted so that they comprise substantially parallelogram-like shapes. Moreover, both described structures may overlap in particular zones. For example, a grate-like structure may be formed. This design may additionally prevent a shear strain of the portion 1011, where such shear strains may be uncomfortable to the user of the shoe 1001.

In further embodiments, the functional second layer 1015 may comprise a different and/or one or more further structures. Accordingly, the individual elements of the second layer 1015 may have shapes that are different from parallelogram-like shapes.

In some embodiments, the global structure, e.g. the first structure and the second structure of the second layer 1015, may be configured so that the second layer 1015 is arranged more densely along the circumference of the shoe 1001 than in the perpendicular direction. Thus, the elastic tensile strength of the upper is increased along the circumference of the shoe 1001 and in this direction increased stability is provided. However, through the use of a correspondingly lower density of the second layer 1015, the tensile strength may not be increased as much along the longitudinal direction of the shoe 1001, particularly in zones where a larger expansion is desired, e.g. according to the improved adjustment of the portion 1011 to the specific size or shape of the foot.

Figure 10D:
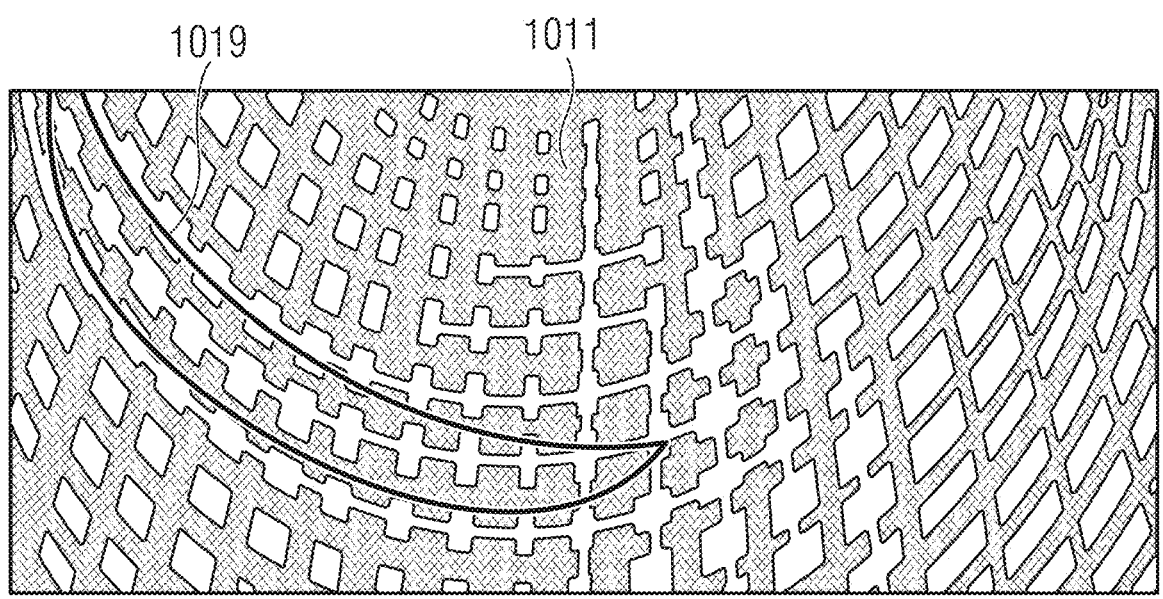
FIG. 10d is a partial top view of the shoe of FIG. 10c.

In addition, zones of the second layer 1015 with a particularly large aspect ratio and, thus, a particularly large anisotropy, may be printed. If a tensile force acts along a highly elastic line formed by the second layer 1015 of the portion 1011, the portion 1011 correspondingly exhibits a large tensile strength. However, if the tensile force acts perpendicular to the line, the tensile strength of the portion 1011, due to the small dimension of the line in this direction, is almost unchanged. In the shoe 1001, for example, a line 1019 in the region of the front instep ensures large restoring forces along the circumference of the shoe 1001. This line element 1019 is illustrated in FIG. 10d. Since the line element 1019 may be designed so that it is particularly narrow, a small restoring force and, thus, a large flexibility in lateral direction, is maintained so that the portion 1011 may globally expand toward the sides and thereby adjust to the instep of the foot. In some embodiments, the line element 1019 is on average not broader than 2 mm but longer than 20 mm. In further embodiments, the second layer 1015 comprises at least one line element 1019 having an aspect ratio of at least 10, i.e., the average dimension in a first direction is at least 10 times larger than the average extension in a second direction. In certain embodiments, the average dimension in a second direction is not larger than 2 mm.

By the design flexibility that is enabled by direct printing methods, area-wide printed zones and isolated layer areas comprising various shapes and very different sizes may be combined indiscriminately but also emphasized individually. Thus, a particularly good local adjustment of functionalities may be achieved. Therein, not only the degree of a particular functionality, i.e., for example the elasticity, may be precisely controlled but also the directional dependence of the functionality may be fine-controlled by means of printed functional second layers. Moreover, the corresponding manufacturing method enabled by the direct printing requires minimal and simple steps, thus providing a particularly fast and cost-effective manufacturing process.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A shoe comprising a sports shoe, wherein at least a portion of an upper of the shoe comprises:
   a. a first layer; and
   b. a printed functional layer set of one or more printed functional layers, wherein the printed functional layer set includes at least a functional second layer,
wherein the functional second layer is directly printed onto the first layer, and
wherein the functional second layer comprises a plurality of isolated layer areas, wherein at least one isolated layer area comprises a largest dimension smaller than 2 mm.

2. The shoe according to claim 1, wherein the portion comprises substantially the entire upper of the shoe.

3. The shoe according to claim 1, wherein the functional second layer is directly printed onto the first layer via a screen printing process or an ink-jet printing process.

4. The shoe according to claim 1, wherein the functional second layer is configured to modify at least one mechanical property of the portion.

5. The shoe according to claim 4, wherein the at least one mechanical property of the portion is at least one of elasticity, cushioning, stiction, and abrasion resistance.

6. The shoe according to claim 1, wherein the portion is elastically deformable by at least 30% in at least one direction.

7. The shoe according to claim 1, wherein the functional second layer comprises polyurethane.

8. The shoe according to claim 1, wherein the functional second layer comprises a poly(tetrahydrofurane)-based polyurethane dispersion.

9. The shoe according to claim 1, wherein the functional second layer anisotropically modifies elasticity of the portion.

10. The shoe according to claim 1, wherein a total thickness of the printed functional layer set is within a range from 0.03 mm to 1 mm.

11. The shoe according to claim 1, wherein the printed functional layer set further includes at least a functional third layer directly printed onto the functional second layer and/or the first layer, wherein the functional second layer and the functional third layer comprise different materials.

12. The shoe according to claim 1, wherein the functional second layer is only arranged on selected zones of the first layer.

13. The shoe according to claim 12, wherein the selected zones are arranged along at least one of a collar, a transition area between a sole and the upper, a toe area, a heel area, and an area of a lateral and/or medial midfoot joints.

14. The shoe according to claim 1, wherein the first layer is elastic and/or breathable.

15. The shoe according to claim 14, wherein the first layer comprises a mesh that is elastic in at least one of a warp and a weft direction.

16. The shoe according to claim 1, wherein the first layer is anisotropically elastic.

17. The shoe according to claim 1, wherein the portion comprises a functional third layer, wherein the functional third layer is directly printed onto the functional second layer and/or the first layer.

18. The shoe according to claim 1, wherein the portion comprises at least one further directly printed functional layer.

19. The shoe according to claim 1, wherein the first layer is manufactured from a weft knitted or warp knitted material.

20. A method for manufacturing at least a portion of an upper of a shoe, the shoe comprising a sports shoe, the method comprising printing a functional second layer directly onto a first layer, wherein the functional second layer comprises a plurality of isolated layer areas, wherein at least one isolated layer area comprises a largest dimension smaller than 2 mm.

21. The method according to claim 20, further comprising the step of directly printing a further functional layer onto the functional second layer and/or the first layer.

22. The method according to claim 21, further comprising the step of drying the functional second layer prior to printing the further functional layer.

23. The method according to claim 20, further comprising the step of curing the functional second layer.

24. The method according to claim 20, wherein first layer is manufactured from a weft knitted or warp knitted material.

25. The shoe according to claim 1, wherein the first layer is provided with an elastic element, wherein the elastic element comprises a thermoplastic elastomer.

26. The shoe according to claim 1, wherein the first layer is provided with a mesh and with an elastic element, wherein the elastic element comprises a thermoplastic elastomer, wherein the functional second layer being directly printed onto the first layer includes at least a part of the functional second layer being directly printed onto the elastic element of the first layer on account of being in one or more zones that already have the elastic element attached thereto.

27. The shoe according to claim 1, wherein at least one isolated layer area comprises a parallelogram-like shape.

* * * * *